US012798526B2

(12) United States Patent
Shin et al.

(10) Patent No.: US 12,798,526 B2
(45) Date of Patent: Nov. 17, 2026

(54) BRAKE APPARATUS FOR VEHICLE

(71) Applicants: HYUNDAI MOBIS CO., LTD., Seoul (KR); INFAC, Suwon-si (KR)

(72) Inventors: Choong Sik Shin, Yongin-si (KR); Il Ho Park, Yongin-si (KR); Sang Pil Boo, Yongin-si (KR); Chang Hun Park, Yongin-si (KR); Se Hoon An, Yongin-si (KR); Jong Hun Park, Suwon-si (KR); Taek Jin Jang, Suwon-si (KR)

(73) Assignees: Hyundai Mobis Co., Ltd., Seoul (KR); INFAC, Suwon-Si (KR)

( * ) Notice: Subject to any disclaimer, the term of this patent is extended or adjusted under 35 U.S.C. 154(b) by 470 days.

(21) Appl. No.: 18/124,723

(22) Filed: Mar. 22, 2023

(65) Prior Publication Data

US 2024/0174202 A1 May 30, 2024

(30) Foreign Application Priority Data

Nov. 29, 2022 (KR) ........................ 10-2022-0162978

(51) Int. Cl.
*B60T 13/74* (2006.01)
*B60T 1/06* (2006.01)
(Continued)

(52) U.S. Cl.
CPC ............ *B60T 1/065* (2013.01); *B60T 13/746* (2013.01); *F16D 55/226* (2013.01); *F16D 65/18* (2013.01);
(Continued)

(58) Field of Classification Search
CPC ............. F16D 2127/06; F16D 2125/40; F16D 2125/48; F16D 2121/24; F16D 63/006; B60T 13/741
See application file for complete search history.

(56) References Cited

U.S. PATENT DOCUMENTS 6,267,207 B1 * 7/2001 Fleischer ................ B60T 7/107 188/106 P
6,315,092 B1 * 11/2001 Schwarz ............... B60T 13/741 188/71.9
(Continued)

FOREIGN PATENT DOCUMENTS

DE 112016000900 T5 11/2017
DE 102022108327 A1 6/2023
(Continued)

OTHER PUBLICATIONS

Office Action issued Oct. 30, 2023 for corresponding German Patent Application No. 102023106874.1.

*Primary Examiner* — Nicholas J Lane
(74) *Attorney, Agent, or Firm* — Morgan, Lewis & Bockius LLP

(57) ABSTRACT

A brake apparatus for vehicle may include: a caliper body, a drive unit connected to the caliper body and generating a rotational force, a transfer gear engaged to the drive unit and transferring the rotational force generated by the drive unit to a piston unit engaged to the transfer gear, a first parking unit rotated together with the transfer gear, a second parking unit movably mounted on the caliper body and, according to a direction of a movement of the second parking unit, selectively interfering with a rotation of the first parking unit, and an adjustment unit mounted to be spaced away from the second parking unit, and) configured for adjusting the direction of the movement of the second parking unit.

11 Claims, 20 Drawing Sheets

(51) Int. Cl.
*F16D 55/226* (2006.01)
*F16D 65/18* (2006.01)
*F16D 121/24* (2012.01)
*F16D 125/48* (2012.01)
*F16D 127/06* (2012.01)

(52) U.S. Cl.
CPC ...... *F16D 2121/24* (2013.01); *F16D 2125/48* (2013.01); *F16D 2127/06* (2013.01)

(56) References Cited

U.S. PATENT DOCUMENTS

| | | | | |
|---|---|---|---|---|
| 8,056,683 | B2 * | 11/2011 | Usui | F16D 65/567 188/82.1 |
| 9,341,222 | B2 * | 5/2016 | Masuda | B60T 13/741 |
| 9,568,057 | B2 * | 2/2017 | Kwon | F16D 65/18 |
| 9,677,631 | B2 * | 6/2017 | Park | F16D 55/225 |
| 9,970,499 | B2 * | 5/2018 | Yamasaki | H02K 7/06 |
| 10,634,202 | B2 * | 4/2020 | Saoyama | H02K 7/06 |
| 12,228,185 | B2 * | 2/2025 | Yoshizu | B60T 13/746 |
| 2014/0000992 | A1 * | 1/2014 | Tajima | B60T 1/005 188/72.1 |
| 2016/0244035 | A1 * | 8/2016 | Yasui | B60T 7/122 |

FOREIGN PATENT DOCUMENTS

| | | | | |
|---|---|---|---|---|
| EP | 1985883 | B1 | 8/2011 | |
| KR | 10-2010-0098846 | A | 10/2010 | |
| WO | WO-2020256551 | A1 * | 12/2020 | F16D 65/183 |

* cited by examiner

BRAKE APPARATUS FOR VEHICLE

CROSS-REFERENCE TO RELATED APPLICATION

This application claims priority from and the benefit of Korean Patent Application No. 10-2022-0162978, filed on Nov. 29, 2022, which is hereby incorporated by reference for all purposes as if set forth herein.

BACKGROUND

Technical Field

The present disclosure relates to a brake apparatus for vehicle and, more particularly, to a brake apparatus for vehicle capable of converting an operating force, generated when a pedal is depressed by a driver, into an electrical signal and thus generating a brake force.

Discussion of the Background

Usually, brake apparatus for vehicle is apparatus that bring a pad into close contact with a disc by pushing a piston using a drive force and thus stop or slow down a vehicle using a frictional force between the pad and the disc.

An electro-mechanical brake (EMB) system is an apparatus, generating a brake force, in which a motor-driven actuator is directly mounted on a caliper and thus presses against the piston through mechanisms, such as a gear or a screw, without using hydraulic pressure. The EMB system is capable of performing active braking and wheel-based independent braking and thus realizing additional functions, such as ABS, ESC, TCS, and AEB, as well as usual primary braking, without causing a hydraulic transmission delay. Accordingly, the EMB system advantageously provides higher performance.

An EMB system in the related art generates a brake force for parking using a technique in which a separate brake apparatus for parking keeps a brake force, generated by a primary braking motor, exerted. However, in a case where a battery, an electric condenser, or the like is discharged due to a vehicle being left unattended for a long time after parking, the brake apparatus for parking has the problem of not keeping the brake force for parking exerted and the problem of not stopping applying of the brake force for parking when a failure occurs and thus not driving the vehicle.

The background art of the present disclosure is disclosed in Korean Patent Application Publication No. 10-2010-0098846 (published on Sep. 10, 2010 and entitled "Disk Brake Having Parking Function")

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An object of the present disclosure is to provide a brake apparatus for vehicle capable of stably maintaining a parking brake state and of forcibly increasing a brake force for parking and stopping applying of the brake force for parking.

In order to accomplish the above-mentioned problems, according to an aspect of the present disclosure, a brake apparatus for vehicle may include: a caliper body; a drive unit connected to the caliper body and configured for generating a rotational force; a transfer gear engaged to the drive unit and transferring the rotational force generated by the drive unit to a piston unit engaged to the transfer gear; a first parking unit rotated together with the transfer gear; a second parking unit movably mounted on the caliper body and, according to a direction of a movement of the second parking unit, selectively interfering with a rotation of the first parking unit; and an adjustment unit mounted to be spaced away from the second parking unit, and configured for adjusting the direction of the movement of the second parking unit.

In the brake apparatus for vehicle, the first parking unit may include: a parking plate supplied with the rotational force from the drive unit and rotated in a forward direction or a reverse direction; a plurality of first parking members extending from the parking plate; and a plurality of parking grooves arranged between neighboring first parking members, wherein the second parking unit may be inserted into the parking groove or separated from the parking groove according to the direction of the movement of the second parking unit.

In the brake apparatus for vehicle, the transfer gear may include: a first transfer gear connected to an output shaft of the drive unit; and a second transfer gear gear-engaged to the first transfer gear, wherein the parking plate may be connected to the output shaft and may be rotated at the same angular speed as the first transfer gear.

In the brake apparatus for vehicle, the plurality of first parking members may be arranged in such a manner as to be spaced away from each other along a circumferential direction of the parking plate.

In the brake apparatus for vehicle, the plurality of first parking members may be equally spaced from each other.

In the brake apparatus for vehicle, the first parking member may include: a first parking body; a first contact surface arranged on a first side of the first parking body and, as the parking plate is rotated in the forward direction, brought into contact with the second parking unit inserted into the parking grooves; and a second contact surface arranged on a second side of the first parking body and, as the parking plate is rotated in the reverse direction, brought into contact with the second parking unit inserted into the parking grooves.

In the brake apparatus for vehicle, the first contact surface may be arranged in a manner that is inclined with respect to an axial direction of the parking plate.

In the brake apparatus for vehicle, when the rotational force applied to the parking plate exceeds a preset magnitude, the first contact surface may separate the second parking unit from the parking grooves.

In the brake apparatus for vehicle, the second contact surface may be arranged in a manner that is in parallel with the axial direction of the parking plate.

In the brake apparatus for vehicle, the second contact surface may be arranged in a manner that is inclined with respect to the axial direction of the parking plate.

In the brake apparatus for vehicle, when the rotational force applied to the parking plate exceeds a preset magnitude, the second contact surface may separate the second parking unit from the parking grooves.

In the brake apparatus for vehicle, the second parking unit may include: a support bracket fixed to the caliper body; a parking lever rotatably connected to the support bracket; and a second parking member extending from a first side of the parking lever and, according to a direction of a rotation of the parking lever, inserted into the parking grooves or separated from the parking grooves.

In the brake apparatus for vehicle, the second parking member may include a plurality of parking latches inserted into different parking grooves, respectively.

In the brake apparatus for vehicle, the parking latch may be formed in such a manner that a width of the parking latch is decreased toward an end thereof.

In the brake apparatus for vehicle, the second parking unit may further include an elastic member provided between the support bracket and the parking lever and rotating the parking lever in a direction in which the second parking member is inserted into the parking grooves.

In the brake apparatus for vehicle, the adjustment unit may include: an adjustment drive member configured for generating a drive force; and an adjustment member reciprocating by the drive force generated by the adjustment drive member and, according to a direction of a movement of the adjustment member, brought into contact with or separated from a second side of the parking lever.

In the brake apparatus for vehicle, as the adjustment member is brought into contact with the other side of the parking lever, the adjustment member may rotate the parking lever in a direction in which the second parking member is separated from the parking grooves.

When parking brake is performed by the first parking unit and the second parking unit, although the drive unit no longer operates, the brake apparatus for vehicle according to the present disclosure can stably maintain the parking brake state.

In addition, the first contact surface is arranged in a manner that is inclined with respect to the axial direction of the parking plate. Thus, in a case where the brake force for parking is additionally required, the brake apparatus for vehicle according to the present disclosure can increase the brake force for parking by forcibly rotating the parking plate in the forward direction.

In addition, the second contact surface is arranged in a manner that is included with respect to the axial direction of the parking plate. Thus, in a case where the brake force for parking does not stop being applied due to a failure or malfunctioning of the adjustment unit, the brake apparatus for vehicle according to the present disclosure can forcibly rotate the parking plate in the reverse direction, and thus can switch to a state where the vehicle can drive.

In addition, in a case where a separate outside force is not applied to the parking lever by the elastic member, the brake apparatus for vehicle according to the present disclosure can always keep the second parking member inserted into the parking grooves. Thus, there is less concern about loss of the brake force due to a battery being discharged or the like.

DETAILED DESCRIPTION OF THE ILLUSTRATED EMBODIMENTS

Figure 1:
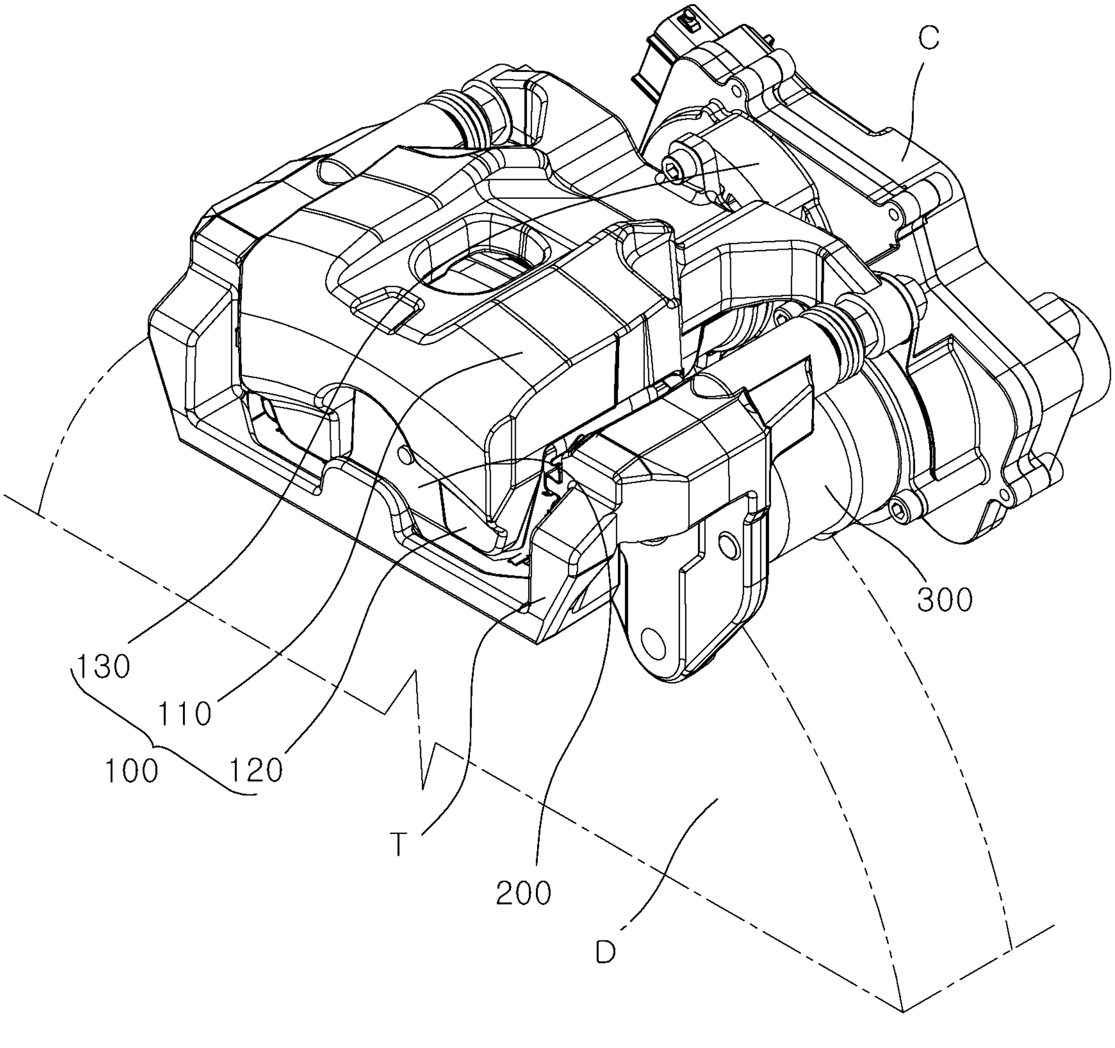
FIG. 1 is a perspective view schematically illustrating a configuration of a brake apparatus for vehicle according to a first embodiment of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Figure 2:
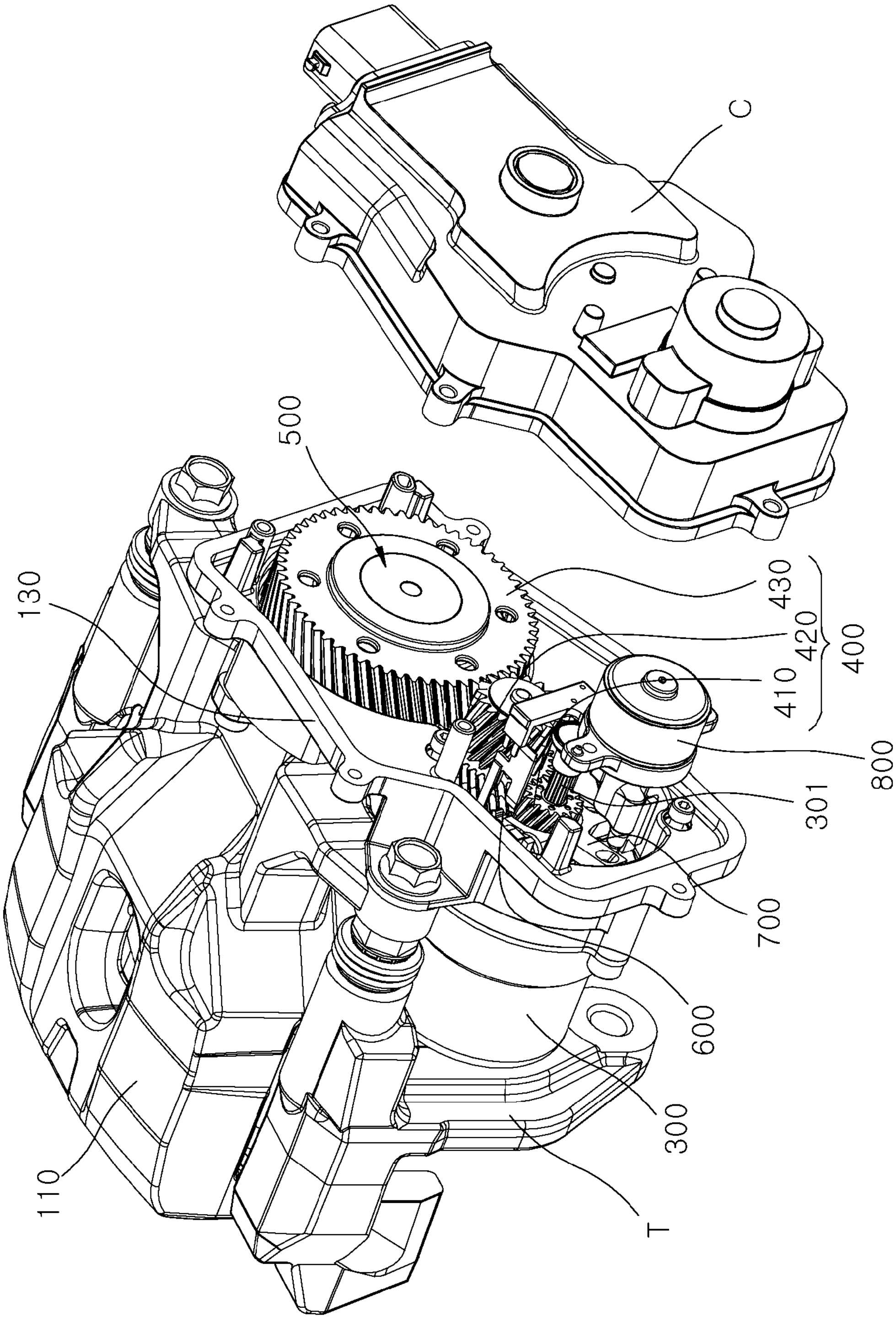
FIG. 2 is a perspective view illustrating the configuration of the brake apparatus for vehicle according to the first embodiment of the present disclosure, when viewed from a different angle than FIG. 1.
Figure 3:
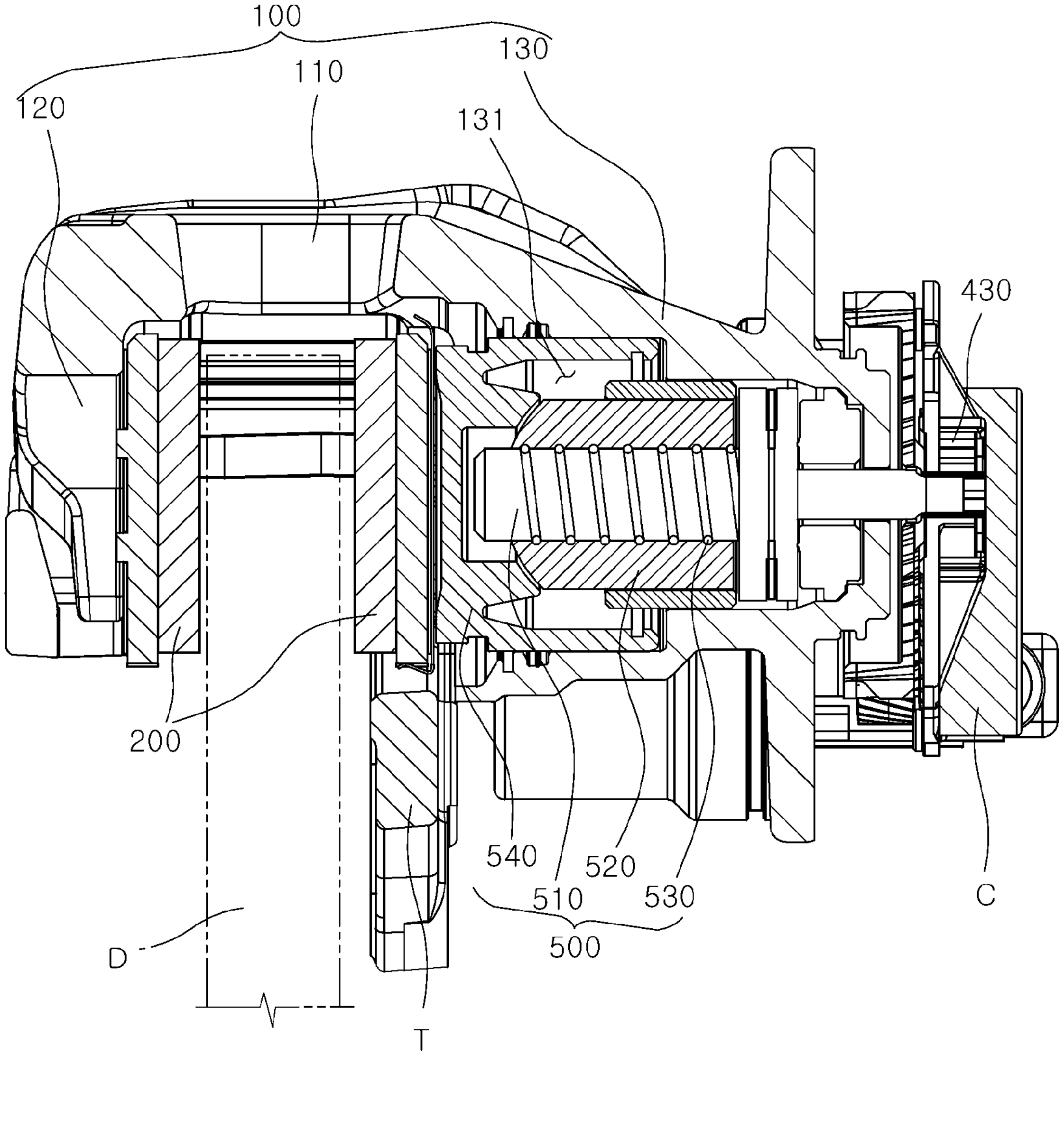
FIG. 3 is a cross-sectional view schematically illustrating the configuration of the brake apparatus for vehicle according to the first embodiment of the present disclosure.
Figure 4:
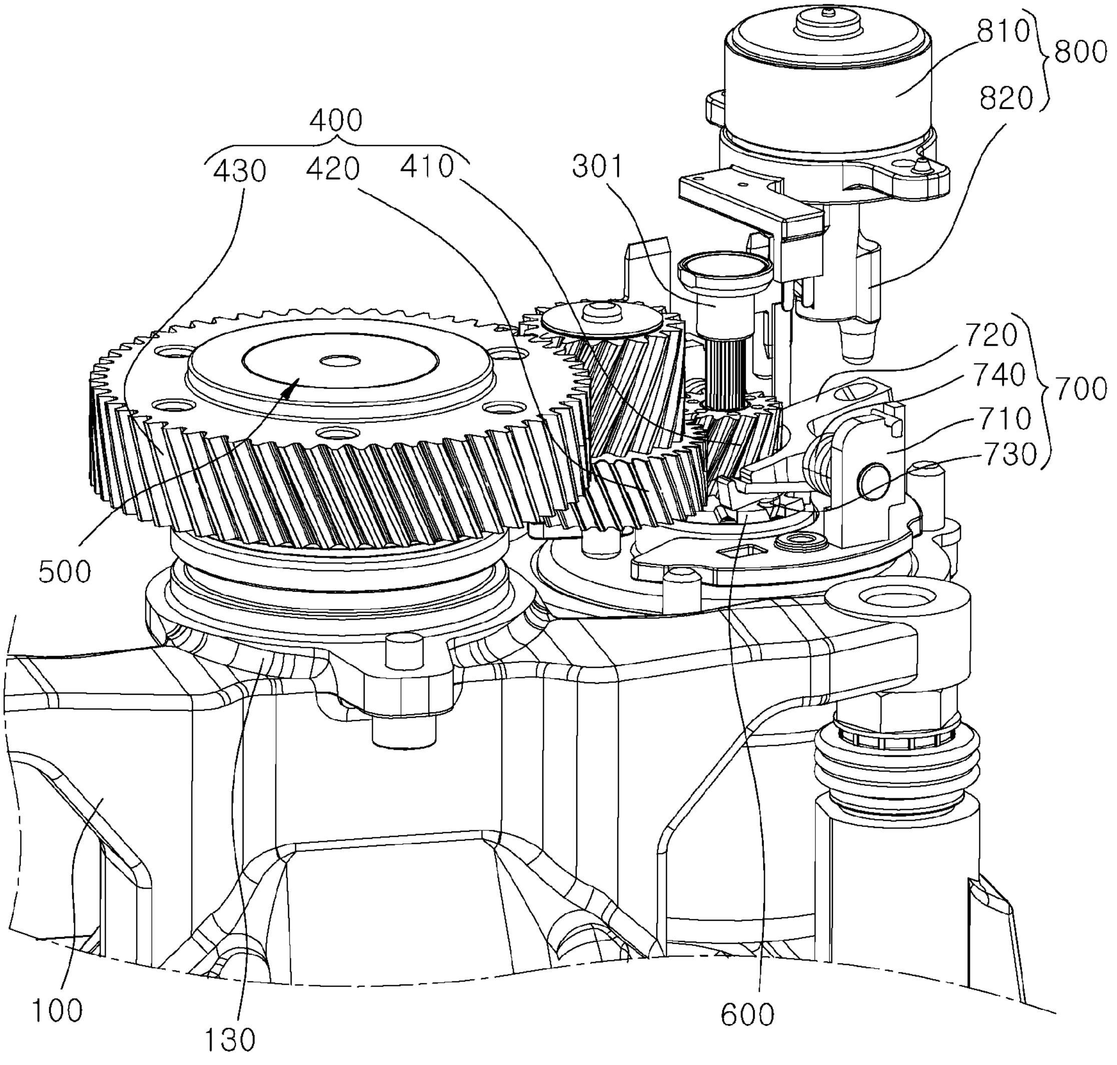
FIG. 4 is an enlarged view schematically illustrating the configuration of the brake apparatus for vehicle according to the first embodiment of the present disclosure.

FIG. 1 is a perspective view schematically illustrating a configuration of a brake apparatus for vehicle according to a first embodiment of the present disclosure. FIG. 2 is a perspective view illustrating a configuration of the brake apparatus for vehicle according to the first embodiment of the present disclosure, when viewed from a different angle than the configuration in FIG. 1. FIG. 3 is a cross-sectional view schematically illustrating the configuration of the brake apparatus for vehicle according to the first embodiment of the present disclosure. FIG. 4 is an enlarged view schematically illustrating the configuration of the brake apparatus for vehicle according to the first embodiment of the present disclosure.

With reference to FIGS. 1 to 4, the brake apparatus for vehicle according to the present embodiment may include a caliper body 100, a drive unit 300, a transfer gear 400, a first parking unit 600, a second parking unit 700, and an adjustment unit 800.

The caliper body 100 forms a general exterior appearance of the brake apparatus for vehicle according to the present embodiment and supports all of the drive unit 300, the transfer gear 400, the piston unit 500, the first parking unit 600, and the second parking unit 700 that are described below. The caliper body 100 may be fixed to a vehicle frame by a torque member T coupled to a knuckle (not illustrated).

The caliper body 100 according to the present embodiment may include a bridge 110, a finger 120, and a cylinder 130.

The bridge 110 forms an exterior appearance of the caliper body 100 when viewed from above and supports the finger 120 and the cylinder 130 that are described below. The bridge 110 may be connected to the torque member T by a guide rod or the like in a manner that allows slide movement. With a reaction force occurring between the brake pad 200 and the piston unit 500 during vehicle braking, the bridge 110 may be moved in a slid manner in a direction in parallel with a moving direction of the piston unit 500. The bridge 110 is not specifically limited to shapes illustrated in FIGS. 1 and 2. It is possible that the bridge 100 is design-changed in such a manner as to have various shapes.

The finger 120 forms the exterior appearance of the caliper body 100 when viewed from the front. The finger 120 presses or no longer presses the brake pad 200 described below against a brake disc D in conjunction with slide movement of the caliper body 100. The finger 120 according to the present embodiment may extend vertically downward from a front end portion of the bridge 110. The finger 120 may be integrally formed with the bridge 110 by welding, press processing, bending processing, or the like.

The cylinder 130 forms the exterior appearance of the caliper body 100 when viewed from the rear and movably supports the piston unit 500 described below. The cylinder 130 according to the present embodiment may extend vertically downward from a rear end portion of the bridge 110. The cylinder 130 may be arranged in such a manner that an inner surface thereof faces an inner surface of the finger 120. An accommodation space 131 may be formed in the cylinder 130 by concavely recessing an inner surface of the cylinder 130 toward an outer surface thereof.

A casing C may be installed on an outer surface of the cylinder 130, that is, the side thereof that is opposite in direction to the accommodation space 131. The casing C according to the present embodiment may be formed in the form of a box in such a manner as to have a space inside and to be open at one side. The casing C may be arranged in such a manner that the open side thereof faces the closed side of the cylinder 130. In this case, the casing C may be arranged in such a manner as to surround all of the transfer gear 400, the first parking unit 600, the second parking unit 700, and the adjustment unit 800 that are described below. Accordingly, the casing C may protect the transfer gear 400, the first parking unit 600, the second parking unit 700, and the adjustment unit 800 from external impact and may prevent introduction of a foreign material. The casing C may be detachably coupled to the cylinder 130 in a bolting-coupled manner or the like.

The brake apparatus for vehicle according to the present embodiment may further include a brake pad 200.

The brake pad 200 is movably supported on the torque member T or the caliper body 100. With operations of the caliper body 100 and the piston unit 500, the brake pad 200 is brought into contact with the brake disc D or separated therefrom and applies or no longer applies a brake force to a vehicle. The brake pads 200 may be formed in one pair. The pair of the brake pads 200 may be supported on the torque member T or the caliper body 100 in a manner that allows slide movement in a direction in parallel with an axial direction of the brake disc D. The pair of the brake pads 200 may be arranged between an inner surface of the finger 120 and the open side of the cylinder 130. The pair of the brake pads 200 may be arranged in such a manner that inner surfaces thereof face the outer surface and the inner surface, respectively, of the brake disc D with the brake disc D in between. In this case, a friction pad made of a material having a high friction coefficient, such as rubber, may be attached on one surface of the brake pad 200 that faces the brake disc D.

The drive unit 300 is connected to the caliper body 100 and is supplied with electric power from the outside, thereby generating a rotational force. The drive unit 300 may be electrically connected to a battery (not illustrated) in the vehicle and may be supplied with electric power therefrom. Examples of the drive unit 300 according to the present embodiment may include various types of electric motors that rotate an output shaft 301 by an electromagnetic interaction between a stator and a rotor. The drive unit 300 may be fixed to the inner surface of the cylinder 130 by bolting, welding, or like. Operation of the drive unit 300 may be controlled under the control of an ECU (not illustrated) or the like of the vehicle.

The output shaft 301 of the drive unit 300 may pass through the inner surface of the cylinder 130 and may protrude over a predetermined distance from the outer surface of the cylinder 130. When the drive unit 300 operates, the output shaft 301 may be rotated in a forward direction or in a reverse direction about the central axis thereof. At this point, the rotation in the forward direction of the output shaft 301 may be one of the clockwise and counterclockwise rotations of the output shaft 301 about the center thereof, and the rotation in the reverse direction of the output shaft 301 may be the other one of the clockwise and counterclockwise rotations of the output shaft 301 about the center thereof.

The transfer gear 400 is rotated in conjunction with a rotational force generated by the drive unit 300. The transfer gear 400 functions as a constituent element that transfers the rotational force generated by the drive unit 300 to the piston unit 500 described below.

The transfer gear 400 according to the present embodiment may include a first transfer gear 410, a second transfer gear 420.

The first transfer gear 410 is connected to the output shaft 301 of the drive unit 300. Examples of the first transfer gear 410 according to the present embodiment may include a hollow helical gear, a hollow spur gear, and the like, on outer circumferential surfaces of which teeth are formed. The first transfer gear 410 is arranged to have the same central axis as the output shaft 301 of the drive unit 300. The output shaft 301 may be inserted into the first transfer gear 410 by passing therethrough. In this case, an inner circumferential surface of the first transfer gear 410 may be spline-coupled to an outer circumferential surface of the output shaft 301. Accordingly, when the drive unit 300 operates, the first transfer gear 410 may be rotated at the same angular speed as the output shaft 301.

The second transfer gear 420 is coupled to the first transfer gear 410 by being engaged therewith and is rotated in conjunction with the rotation of the first transfer gear 410. The second transfer gear 420 according to the present embodiment may be configured to include the hollow helical gear, the hollow spur gear, and the like, on outer circumferential surfaces of which teeth are formed. The second transfer gear 420 may be arranged in such a manner that the central axis thereof is in parallel with the central axis of the first transfer gear 410. The second transfer gear 420 may be supported on the outer surface of the cylinder 130 by a separate shaft (not illustrated) or the like in a manner that is rotatable about the central axis thereof. The second transfer gear 420 may be coupled to the first transfer gear 410 by engaging an outer circumferential surface of the second transfer gear 420 with an outer circumferential surface of the first transfer gear 410. When the first transfer gear 410 is rotated, the second transfer gear 420 may be rotated about the central axis thereof in the opposite direction to the first transfer gear 410. The second transfer gear 420 may have a greater diameter than the first transfer gear 410. Accordingly, the second transfer gear 420 may multiply a magnitude of a rotational force transferred from the first transfer gear 410 to the third transfer gear 430 described below.

The transfer gear 400 according to the present embodiment may further include a third transfer gear 430.

The third transfer gear 430 is coupled to the second transfer gear 420 by being engaged therewith and is rotated in conjunction with the rotation of the second transfer gear 420. The third transfer gear 430 functions as a constituent element that, as the last operation in the order of operations, transfers the rotational force generated by the drive unit 300 to the piston unit 500 described below. Examples of the third transfer gear 430 according to the present embodiment may include a hollow helical gear, a hollow spur gear, and the like, on outer circumferential surfaces of which teeth are formed. The third transfer gear 430 may be arranged in such a manner that the central axis thereof is in parallel with the central axis of the second transfer gear 420. The third transfer gear 430 may be supported on the outer surface of the cylinder 130 by a ball screw 510 of the piston unit 500 in a manner that is rotatable about the central axis thereof. The third transfer gear 430 may be coupled to the second transfer gear 420 by engaging an outer circumferential surface of the third transfer gear 430 with the outer circumferential surface of the second transfer gear 420. When the second transfer gear 420 is rotated, the third transfer gear 430 may be rotated about the central axis thereof in the opposite direction to the second transfer gear 420. The third transfer gear 430 may be formed in such a manner as to have a greater diameter than the second transfer gear 420. Accordingly, when the second transfer gear 420 rotates, the third transfer gear 430 may be rotated at a lower angular speed than the second transfer gear 420 and may multiply a magnitude of a rotational force transferred to the piston unit 500.

The brake apparatus for vehicle according to the present embodiment may further include a piston unit 500.

The piston unit 500 is installed on the caliper body 100, more particularly, on the cylinder 130 in a manner that is enabled to be moved backward and forward. The piston unit 500 is connected to the transfer gear 400 and is supplied, through the transfer gear 400, with the rotational force generated by the drive unit 300. The piston unit 500 is moved backward and forward by the supplied rotational force. The piston unit 500 presses or no longer presses the brake pad 200 against the brake disc D according to whether the piston unit 500 is moved forward or backward, and thus applies or no longer applies a brake force to the vehicle. More specifically, as the output shaft 301 is rotated in the forward direction, the piston unit 500 is moved forward toward the brake pad 200, presses the brake pad 200 against the brake disc D, and thus generates the brake force. In addition, as the output shaft 301 is rotated in the reverse direction, the piston unit 500 is moved backward, no longer presses the brake pad 200, and thus no longer generates the brake force.

The piston unit 500 according to the first embodiment, may include a ball screw 510, a ball nut 520, a rolling body 530, and a piston member 540.

The ball screw 510 is connected to the transfer gear 400 and is rotated. The ball screw 510 according to the present embodiment is formed in such a manner to have approximately the shape of a bar and may be arranged inside the accommodation space 131 in the cylinder 130. The ball screw 510 may be installed inside the accommodation space 131 in a manner that is rotatable about the central axis thereof. The ball screw 510 may be arranged in such a manner that a lengthwise direction thereof is in parallel with a lengthwise direction of the accommodation space 131. A rear end portion of the ball screw 510 may pass through the cylinder 130 from the inner surface to the outer surface and may protrude over a predetermined distance from the outer surface of the cylinder 130. The rear end portion of the ball screw 510 may be inserted into the central portion of the third transfer gear 430 by passing therethrough. An outer circumferential surface of the rear end portion of the ball screw 510 may be spline-coupled to an inner circumferential surface of the third transfer gear 430. Accordingly, when the third transfer gear 430 is rotated, the ball screw 510, together with the third transfer gear 430, may be rotated about the central axis thereof. A groove in which a circumferential of one side of the rolling body 530 described below is seated may be formed in an outer circumferential surface of the ball screw 510. The groove may spirally extend along a lengthwise direction of the ball screw 510 and thus may provide a circulation path for the rolling body 530.

The ball nut 520 is connected to the ball screw 510 and reciprocates in a straight line in conjunction with the rotation of the ball screw 510. The ball nut 520 according to the present embodiment may be formed in such a manner to have the shape of a cylinder and may be arranged inside the accommodation space 131. The ball nut 520 may be arranged in such a manner that an inner circumferential surface thereof is spaced a predetermined distance apart away from the outer circumferential surface of the ball screw 510 and faces the outer circumferential surface thereof. A groove in which a circumference of the other side of the rolling body 530 described below is seated may be formed in the inner circumferential surface of the ball nut 520. The groove may spirally extend along a lengthwise direction of the ball nut 520 and thus may provide the circulation path for the rolling body 530. The ball nut 520 may be supplied with a rotational force of the ball screw 510 through the rolling body 530. When the ball screw 510 is rotated, circulation movement of the rolling body 530 described below may cause the ball nut 520 to be moved backward and forward in a straight line in the forward-backward direction along the lengthwise direction of the ball screw 510. At this point, in a case where the output shaft 301 of the drive unit 300 is rotated in the forward direction, the ball nut 520 may be moved forward along the lengthwise direction of the ball screw 510. In addition, in a case where the output shaft 301 of the drive unit 300 is rotated in the reverse direction, the ball nut 520 may be moved backward along the lengthwise direction of the ball screw 510.

The rolling body 530 is provided between the ball screw 510 and the ball nut 520, and both sides thereof are brought into rolling contact with the ball screw 510 and the ball nut 520, respectively. The rolling body 530 according to the present embodiment may be formed in such a manner as to have approximately the shape of a sphere and may be installed between the ball screw 510 and the ball nut 520. Circumferences of both sides of the rolling body 530 may be brought into rolling contact with grooves, respectively, formed in the outer circumferential surface of the ball screw 510 and the inner circumferential surface of the ball nut 520. A plurality of rolling bodies 530 may be formed. When the ball screw 510 is rotated, the plurality of rolling bodies 530 are moved in a circulating manner along the grooves, and thus, rotational movement of the ball screw 510 is converted into straight-line reciprocating movement of the ball nut 520.

The piston member 540, together with the ball nut 520, reciprocates in a straight line and presses or no longer presses the brake pad 200 according to whether the ball nut 520 is moved forward or backward. The piston member 540 according to the present embodiment may be installed inside the accommodation space 131 in a manner that allows slide movement. A rear end portion of the piston member 540 may be integrally coupled to a front end portion of the ball nut 520 and, together with the ball nut 520, may reciprocate in a straight line along the lengthwise direction of the cylinder 130. As the ball nut 520 is moved forward, a front end portion of the piston member 540 is brought into contact with the brake pad 200 and thus presses the brake pad 200 against the brake disc D. As the ball nut 520 is moved backward, the piston member 540 is separated from the brake pad 200 and no longer presses the brake pad 200.

The first parking unit 600 functions as a constituent element that is rotated together with the transfer gear 400, selectively interferes with the second parking unit 700 described below, and generates a brake force for parking.

Figure 5:
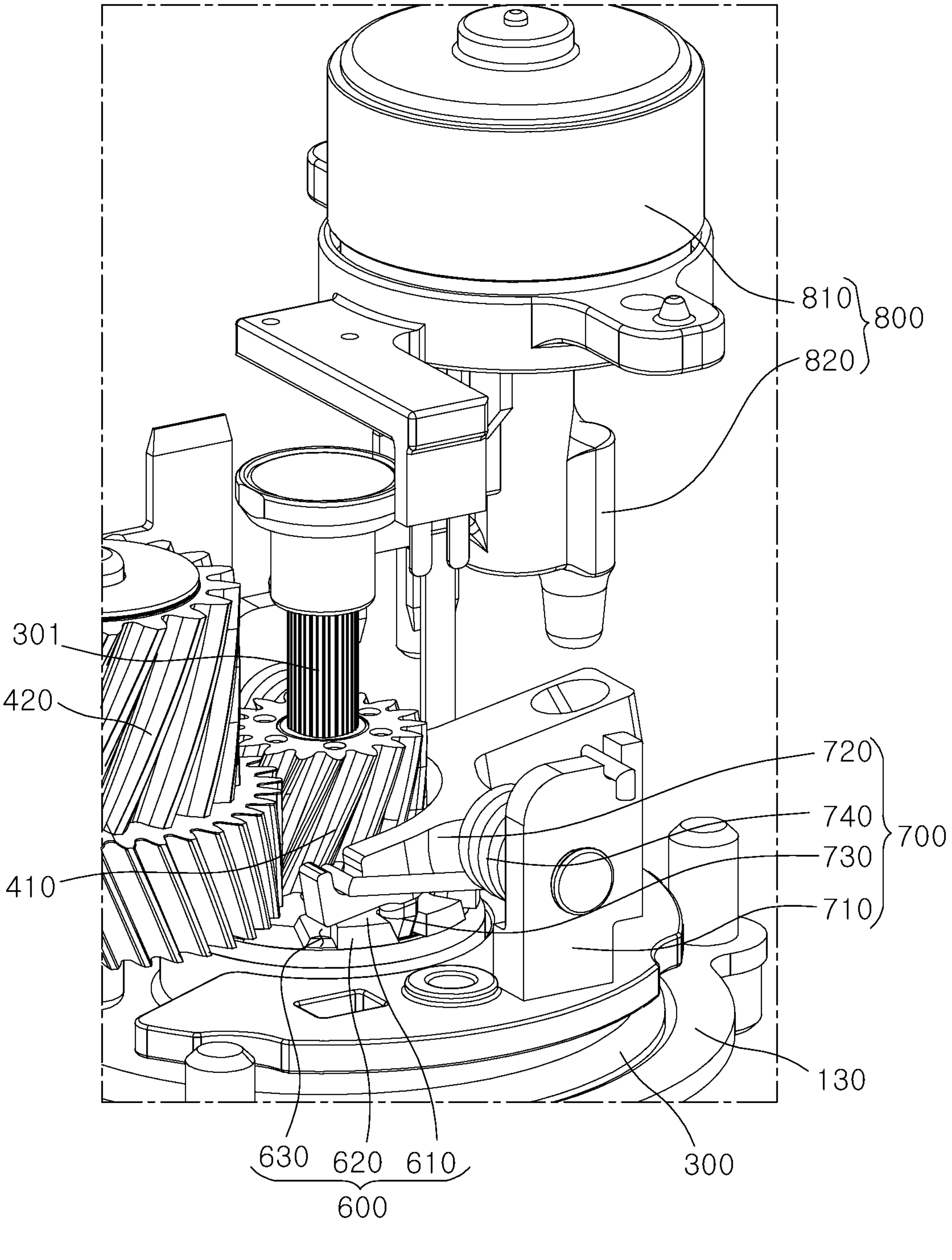
FIG. 5 is a perspective view schematically illustrating a state where a first parking unit, a second parking unit, and an adjustment unit according to the first embodiment of the present disclosure are installed.
Figure 6:
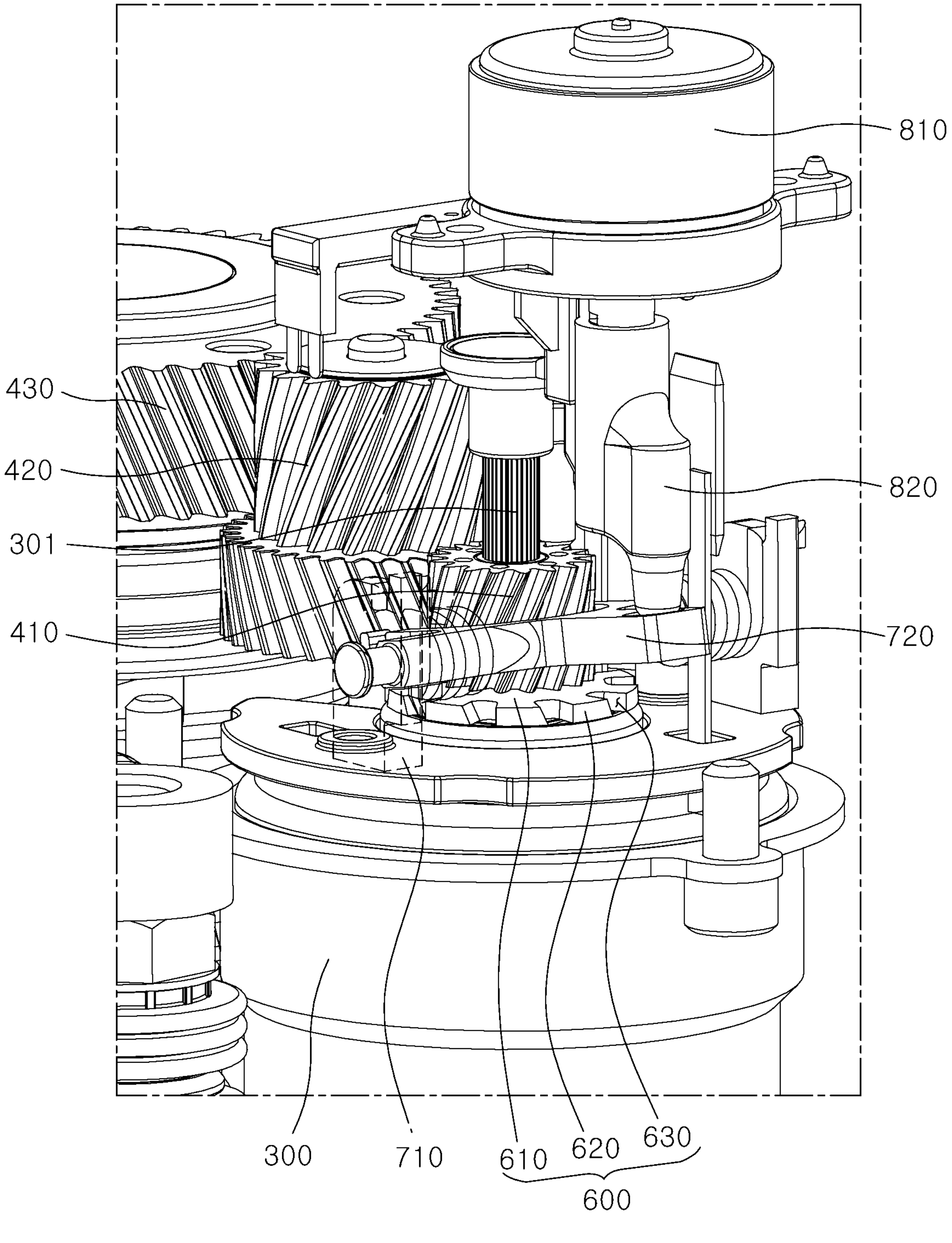
FIG. 6 a perspective view schematically illustrating the state where the first parking unit, the second parking unit, and the adjustment unit according to the first embodiment of the present disclosure are installed, when viewed from a different angle than FIG. 5.
Figure 7:
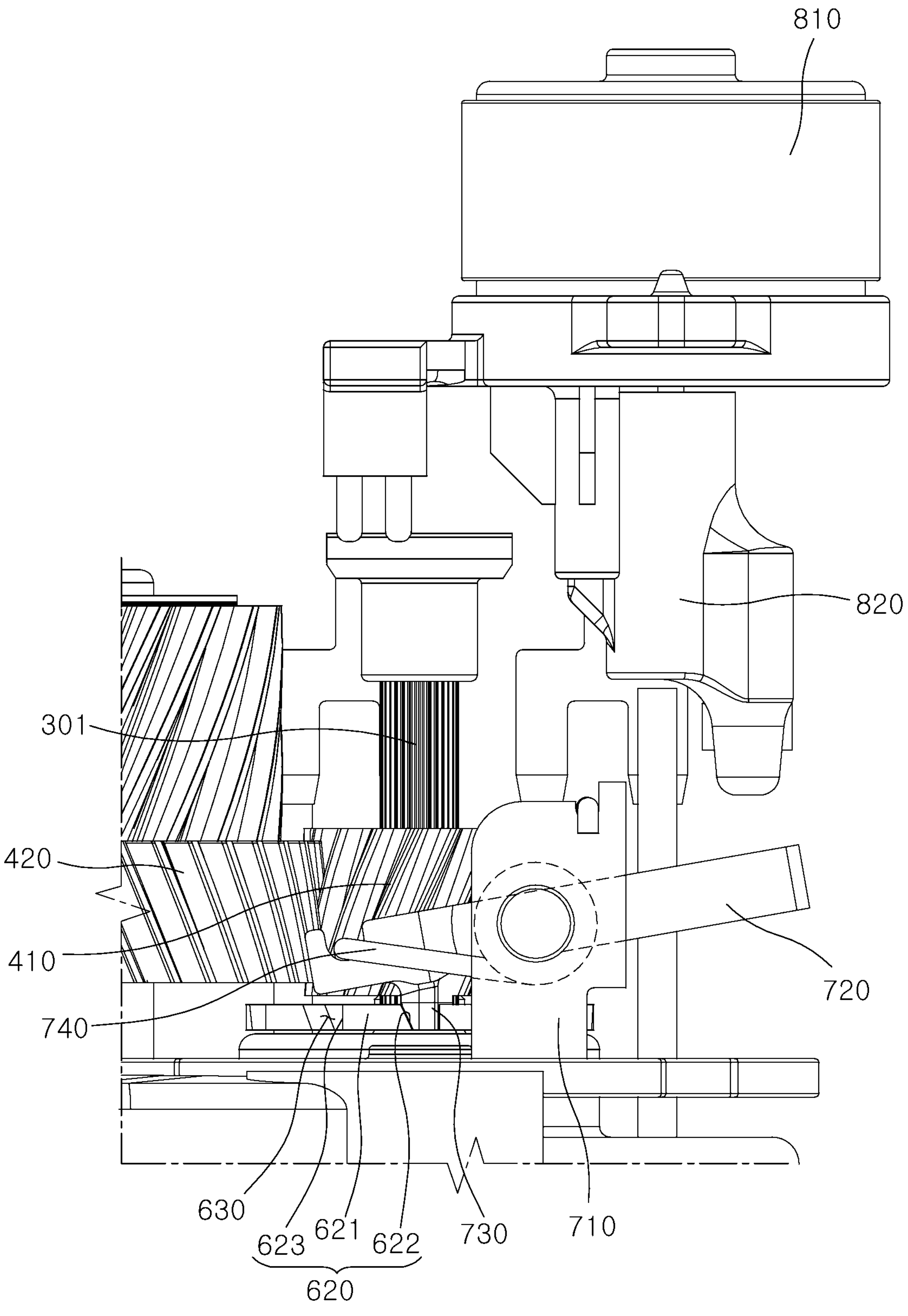
FIG. 7 is a front view schematically illustrating a state where the first parking unit, the second parking unit, and the adjustment unit according to the first embodiment of the present disclosure are installed.
Figure 8:
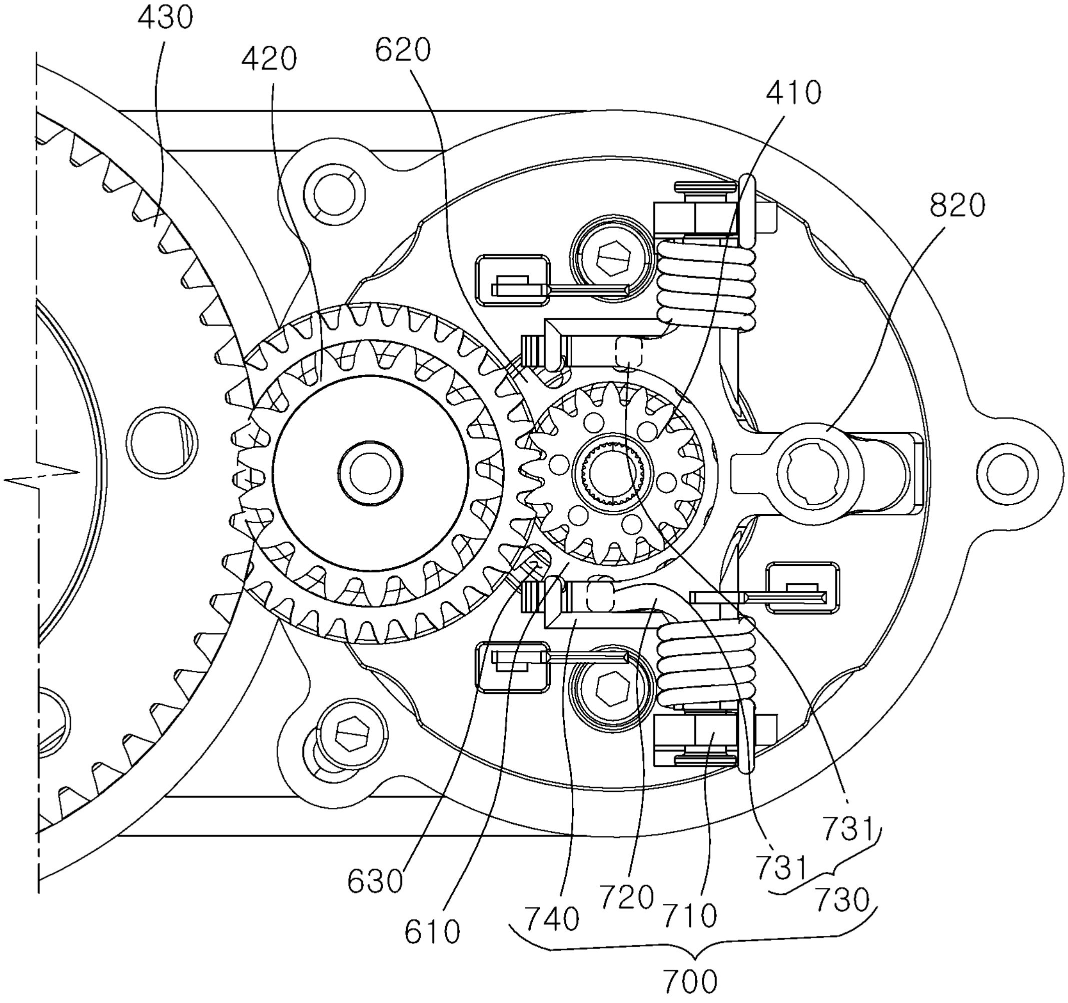
FIG. 8 is a plan view schematically illustrating a state where the first parking unit, the second parking unit, and the adjustment unit according to the first embodiment of the present disclosure are installed.
Figure 9:
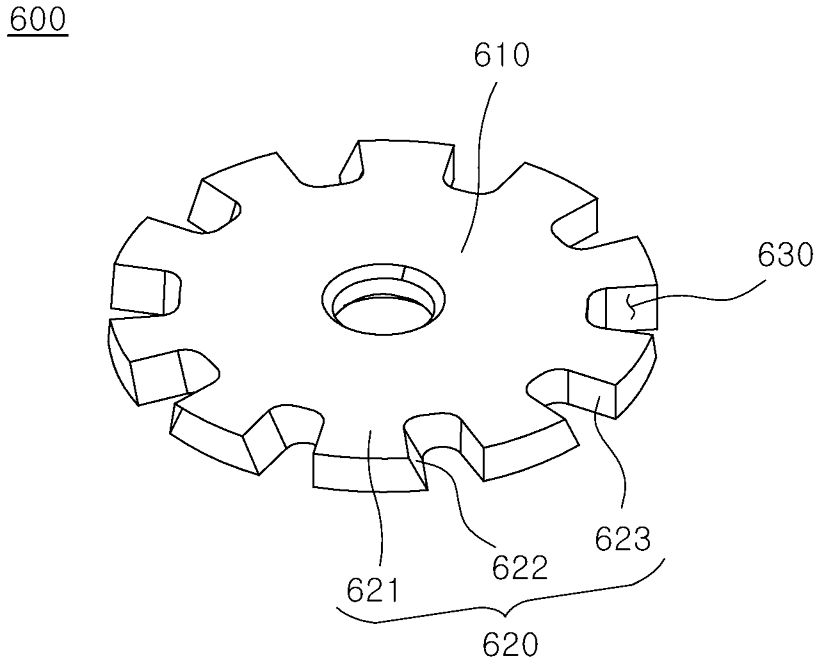
FIG. 9 is a perspective view schematically illustrating a configuration of the first parking unit according to the first embodiment of the present disclosure.

FIG. 5 is a perspective view schematically illustrating a state where the first parking unit 600, the second parking unit 700, and the adjustment unit 800 according to the first embodiment of the present disclosure are installed. FIG. 6 a perspective view schematically illustrating the state where the first parking unit 600, the second parking unit 700, and the adjustment unit 800 according to the first embodiment of the present disclosure are installed, when viewed from a different angle than FIG. 5. FIG. 7 is a front view schematically illustrating a state where the first parking unit 600, the second parking unit 700, and the adjustment unit 800 according to the first embodiment of the present disclosure are installed. FIG. 8 is a plan view schematically illustrating a state where the first parking unit 600, the second parking unit 700, and the adjustment unit 800 according to the first embodiment of the present disclosure are installed. FIG. 9 is a perspective view schematically illustrating a configuration of the first parking unit 600 according to the first embodiment of the present disclosure.

With reference to FIGS. 5 to 9, the first parking unit 600 according to the present embodiment may include a parking plate 610, a first parking member 620, and a parking groove 630.

The parking plate 610 is supplied with the rotational force from the drive unit 300 and is rotated in the forward direction or in the reverse direction. The parking plate 610 according to the present embodiment may be formed in such a manner as to have the shape of a hollow circular plate. The parking plate 610 may be connected to the output shaft 301 and, when the output shaft 301 is rotated, may be rotated in the forward direction or in the reverse direction, together with the output shaft 301. For example, an inner circumferential surface of the parking plate 610 may be spline-coupled to an outer circumferential surface of the output shaft 301 in a state where the output shaft 301 is inserted into the parking plate 610. When the parking plate 610 is connected to the output shaft 301, the parking plate 610 may be rotated at the same angular speed as the first transfer gear 410. Accordingly, the parking plate 610 may reduce a magnitude of a load applied to the second parking unit 700 and the adjustment unit 800 more than when connected to the second transfer gear 420 or the third transfer gear 430, a rotational force of which is multiplied due to a gear ratio. The parking plate 610, as illustrated in FIGS. 5 to 9, may be arranged below the first transfer gear 410. It is also possible that the parking plate 610 is arranged above the first transfer gear 410.

The first parking member 620 functions as a constituent element that extends from the parking plate 610 and forms a structure that interferes with the second parking unit 700 described below. A plurality of first parking members 620 may be formed. The plurality of first parking members 620 may be arranged in such a manner as to be spaced away from each other along a circumferential direction of the parking plate 610. In this case, the plurality of first parking members 620 may be arranged in such a manner as to be equally spaced from each other along the circumferential direction of the parking plate 610. A specific structure of the first parking member 620 is described below.

The parking groove 630 is arranged between the neighboring first parking members 620 and provides a space into which a parking latch 731 of the second parking unit 700 described below is inserted. The first parking members 620 are arranged in such a manner as to be spaced from each other and to be in the neighborhood. An example of the parking groove 630 according to the present embodiment may be an empty space formed between the neighboring first parking members 620. A plurality of parking grooves 630 may be formed. The plurality of parking grooves 630 may be formed in such a manner as to be spaced away from each other along the circumferential direction of the parking plate 610. In this case, the plurality of parking grooves 630 and the plurality of first parking members 620 may be alternately arranged along a circumferential direction of the parking plate 610.

Each of the first parking members 620 according to the present embodiment may include a first parking body 621, a first contact surface 622, and a second contact surface 623.

The first parking body 621 forms a general exterior appearance of the first parking member 620 and provides a space in which the first contact surface 622 and the second contact surface 623 that are described below may be formed. The first parking body 621 according to the present embodiment may be formed in the shape of a column in such a manner as to extend from an outer circumferential surface of the parking plate 610 along a radial direction of the parking plate 610.

The first contact surface 622 is arranged on one side of the first parking body 621. As the parking plate 610 is rotated in the forward direction, the first contact surface 622 may be brought into contact with the second parking unit 700 inserted into the parking groove 630, more particularly, with one surface of the parking latch 731. Accordingly, in a case where the parking latch 731 is inserted into the parking groove 630, the first contact surface 622 may restrict the parking plate 610 from being rotated in the forward direction. The first contact surface 622 according to the present embodiment may be arranged on a surface of one side of the first parking body 621 that faces one of a pair of the neighboring parking grooves 630.

The first contact surface 622 may be arranged in manner that is inclined with respect to an axial direction of the parking plate 610. For example, as illustrated in FIGS. 7 and 9, the first contact surface 622 may be arranged in such a manner that the more closely an upper end (with respect to FIG. 7) of the first parking body 621 is approached, the smaller a width of the first parking body 621 with respect to the circumferential direction of the parking plate 610. In a case where a rotational force applied in the forward direction to the parking plate 610 exceeds a preset magnitude, due to an inclination angle, the first contact surface 622 may guide separation of the parking latch 731 from the parking groove 630. Accordingly, in a case where an additional brake force for parking is required, the first contact surface 622 may guide forced rotation of the parking plate 610 in the forward direction.

The second contact surface 623 is arranged on the other side of the first parking body 621. As the parking plate 610 is rotated in the reverse direction, the second contact surface 623 may be brought into contact with the second parking unit 700 inserted into the parking groove 630, more particularly, with the other surface of the parking latch 731. Accordingly, in a case where the parking latch 731 is inserted into the parking groove 630, the second contact surface 623 may prevent the parking plate 610 from being rotated in the reverse direction and thus may prevent arbitrary stopping of the applying of the brake force for parking. The second contact surface 623 according to the present embodiment may be arranged on a surface of the other side of the first parking body 621 that faces the other one of the pair of the neighboring parking grooves 630. The second contact surface 623 may be arranged in a manner that is in parallel with the axial direction of the parking plate 610.

The second parking unit 700 is movably installed on the caliper body 100 and selectively interferes with the rotation of the first parking unit 600 according to a direction of movement of the second parking unit 700. More specifically, according to the direction of movement of the second parking unit 700, the second parking unit 700 may be inserted into the parking groove 630 or may be separated from the parking groove 630. In a case where the second parking unit 700 is inserted into the parking groove 630, the second parking unit 700 may be engaged with the first parking member 620 and thus may restrict the parking plate 610 and the transfer gear 400 from being rotated. Accordingly, after the brake force for parking is generated by the operation of the drive unit 300, although the drive unit 300 stops operating, the second parking unit 700 may prevent arbitrary stopping of the applying of the generated brake force for parking. In addition, in a case where the second parking unit 700 is separated from the parking groove 630, the second parking unit 700 may allow the parking plate 610 and the transfer gear 400 to be rotated. Accordingly, while the vehicle normally travels, the second parking unit 700 may guide smooth transfer of the rotational force generated by the drive unit 300 to the piston unit 500.

Figure 10:
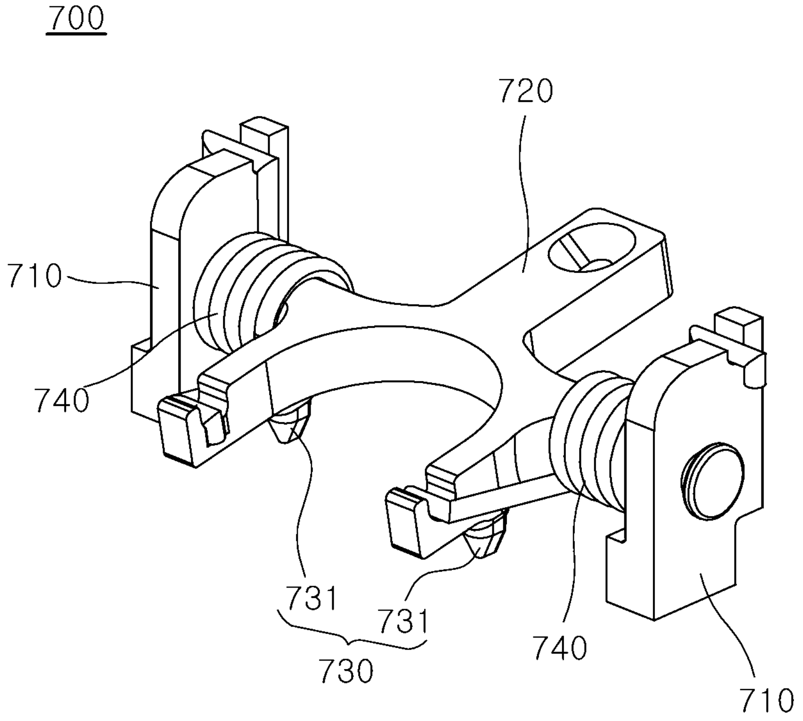
FIG. 10 is a perspective view schematically illustrating a configuration of the second parking unit according to the first embodiment of the present disclosure.
Figure 11:
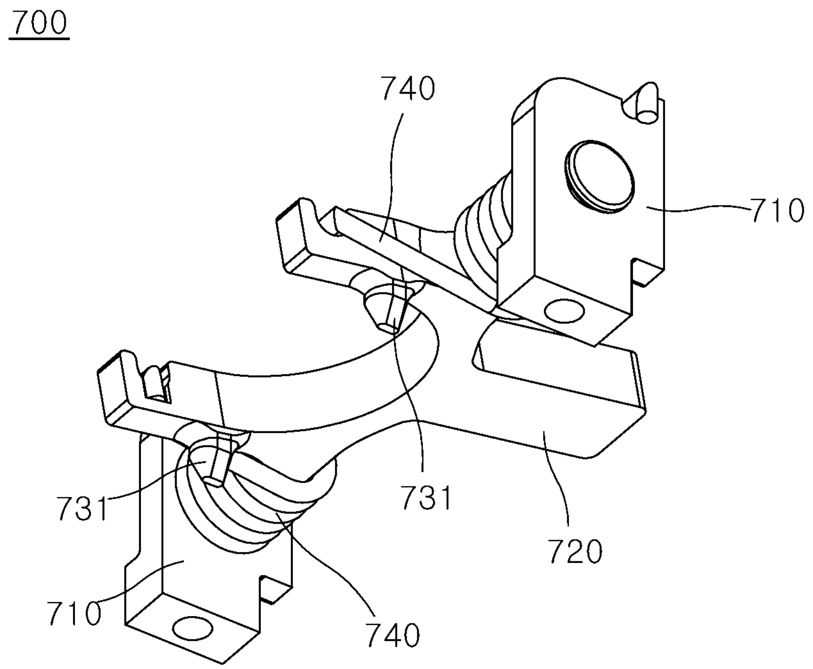
FIG. 11 is a perspective view schematically illustrating the configuration of the second parking unit according to the first embodiment of the present disclosure, when viewed from below.

FIG. 10 is a perspective view schematically illustrating a configuration of the second parking unit according to the first embodiment of the present disclosure. FIG. 11 is a perspective view schematically illustrating the configuration of the second parking unit according to the first embodiment of the present disclosure, when viewed from below.

With reference to FIGS. 5 to 8, 10, and 11, the second parking unit 700 according to the present embodiment may include a support bracket 710, a parking lever 720, a second parking member 730.

The support bracket 710 is fixed to the caliper body 100 and supports the parking lever 720 described below. One side of the support bracket 710 according to the present embodiment may be fixed to the outer surface of the cylinder 130, and the other side thereof may extend along a lengthwise direction of the output shaft 301. The support bracket 710 may be integrally fixed to the cylinder 130, by welding or the like. It is also possible that the support bracket 710 is detachably coupled to the cylinder 130 by bolting or the like. The support brackets 710 may be formed in one pair. The support brackets 710 in one pair may be arranged on the outer surface of the cylinder 130 in such a manner as to be spaced a predetermined distance apart away from each other and in parallel with each other. The support bracket 710 is not limited to shapes illustrated in FIGS. 10 and 11. It is possible that the support bracket 710 is variously design-changed in a range of shapes in such a manner as to rotatably support the parking lever 720 described below.

The parking lever 720 is arranged in such a manner as to be spaced away from the first parking unit 600 and is rotatably connected to the support bracket 710. The parking lever 720 according to the present embodiment may be arranged between one pair of the support brackets 710. The parking lever 720 may be rotatably connected to the support bracket 710 by a pin coupling, a hinge coupling, or the like. In this case, the parking lever 720 may be supported in a manner that is rotatable about a direction vertical to the lengthwise direction of the output shaft 301. Both sides of the parking lever 720 may extend in opposite directions with respect to the support bracket 710. One side of the parking lever 720 may be formed in such a manner as to be "□"-shaped and may extend toward the first transfer gear 410. One side of the parking lever 720 may be arranged in such a manner that a lower surface thereof (with respect to FIG. 7) faces an upper surface of the first parking body 621. One side of the parking lever 720 may be arranged in such a manner that an inner surface thereof surrounds an outer circumferential surface of the first transfer gear 410. The other side of the parking lever 720 may be formed in such a manner as to have approximately the shape of a bar and may extend remotely from the first transfer gear 410.

The second parking member 730 extends from one side of the parking lever 720 and is rotated together with the parking lever 720. The second parking member 730 may be inserted into the parking groove 630 or may be separated from the parking groove 630 according to a direction of the rotation of the parking lever 720.

The second parking member 730 according to the present embodiment may include a plurality of parking latches 731. The parking latch 731 may be formed in the shape of a protrusion in such a manner as to extend downward from a lower surface (with respect to FIG. 7) of one side of the parking lever 720. In a case where the parking lever 720 is rotated counterclockwise with respect to FIG. 7, the parking latch 731 is inserted into the parking groove 630 and is engaged with the first parking member 620, thereby restricting the parking plate 610 from being rotated. In addition, in a case where the parking lever 720 is rotated clockwise with respect to FIG. 7, the parking latch 731 is separated from the parking groove 630 and allows the parking plate 610 to be rotated. A plurality of parking latches 731 may be formed. The plurality of parking latches 731 may be arranged in such a manner as to be spaced away from each other with the first transfer gear 410 in between. In the case where the parking lever 720 is rotated counterclockwise with respect to FIG. 7, the plurality of parking latches 731 may be inserted into different parking grooves 630, respectively. The parking latch 731 may be formed in such a manner that a width thereof is decreased toward the end thereof. Accordingly, the parking latch 731 may be inserted into the parking groove 630 in a smoother manner.

The second parking unit 700 according to the present embodiment may further include an elastic member 740.

The elastic member 740 is provided between the support bracket 710 and the parking lever 720 and rotates the parking lever 720 in a direction in which the second parking member 730 is inserted into the parking groove 630. That is, in a case where a separate outside force is not exerted on the parking lever 720, the elastic member 740 functions as a constituent element that guides the second parking member 730 in maintaining a state of being inserted into the parking groove 630. Accordingly, the elastic member 740 may prevent the second parking member 730 from being separated from the parking groove 630 due to outside vibration or a reaction force occurring between the first parking member 620 and the second parking member 730. In addition, in a case where the second parking member 730 is separated from any one of the parking grooves 630 due to the forced rotation of the parking plate 610, the elastic member 740 may guide inserting of the second parking member 730 back into the neighboring parking groove 630. The elastic member 740 according to the present embodiment may be formed in such a manner as to have the shape of a torsion spring. The elastic member 740 may be arranged between the support bracket 710 and the parking lever 720, and both sides thereof may be fixed to the support bracket 710 and the parking lever 720, respectively. The elastic member 740 may additionally exert a rotational force, resulting from an elastic force thereof, on the parking lever 720 in the counterclockwise direction (with respect to FIG. 7). The elastic members 740 may be formed in one pair. The elastic members 740 in one pair may be individually installed on the support brackets 710, respectively, in one pair.

The adjustment unit 800 is arranged in such a manner as to be spaced away from the second parking unit 700 and adjusts a direction in which the second parking unit 700 is moved. That is, the adjustment unit 800 functions as a constituent element that, with a drive force of itself, varies a state where the first parking unit 600 and the second parking unit 700 interfere with each other.

The adjustment unit 800 according to the present embodiment may include an adjustment drive member 810 and an adjustment member 820.

The adjustment drive member 810 generates a drive force for operating the adjustment member 820 described below. Examples of the adjustment drive member 810 according to the present embodiment may include various types of electric motors that are supplied with electric power from the outside and generate a rotational force. However, the adjustment drive member 810 is not limited to these various types of electric motors. It is possible that the adjustment drive member 810 is design-changed to various types of actuators that can generate a drive force for operating the adjustment member 820, such as a solenoid, a cylinder, or the like. The adjustment drive member 810 may be fixed to the casing C by a separate bracket or the like. The adjustment drive member 810 may be supplied with electric power from the battery in the vehicle or the like. Operation of the adjustment drive member 810 may be adjusted under the control of the ECU (not illustrated) or the like of the vehicle.

The adjustment member 820 is connected to the adjustment drive member 810 and is arranged in such a manner as to face the other side of the parking lever 720. The adjustment member 820 may reciprocate by a drive force generated by the adjustment drive member 810. The adjustment member 820 according to the present embodiment may include various types of devices capable of converting rotational force generated by the adjustment drive member 810 into linear reciprocating motion, such as a ball screw. The adjustment member 820 may be brought into contact with the other side of the parking lever 720 or may be separated therefrom according to a direction of the movement of the adjustment member 820. In a case where the adjustment member 820 is brought into contact with the other side of the parking lever 720, the adjustment member 820 may rotate the parking lever 720 in a direction in which the second parking member 730 is separated from the parking groove 630.

A process of operating brake apparatus for vehicle according to the first embodiment of the present disclosure is described below.

Figure 12:
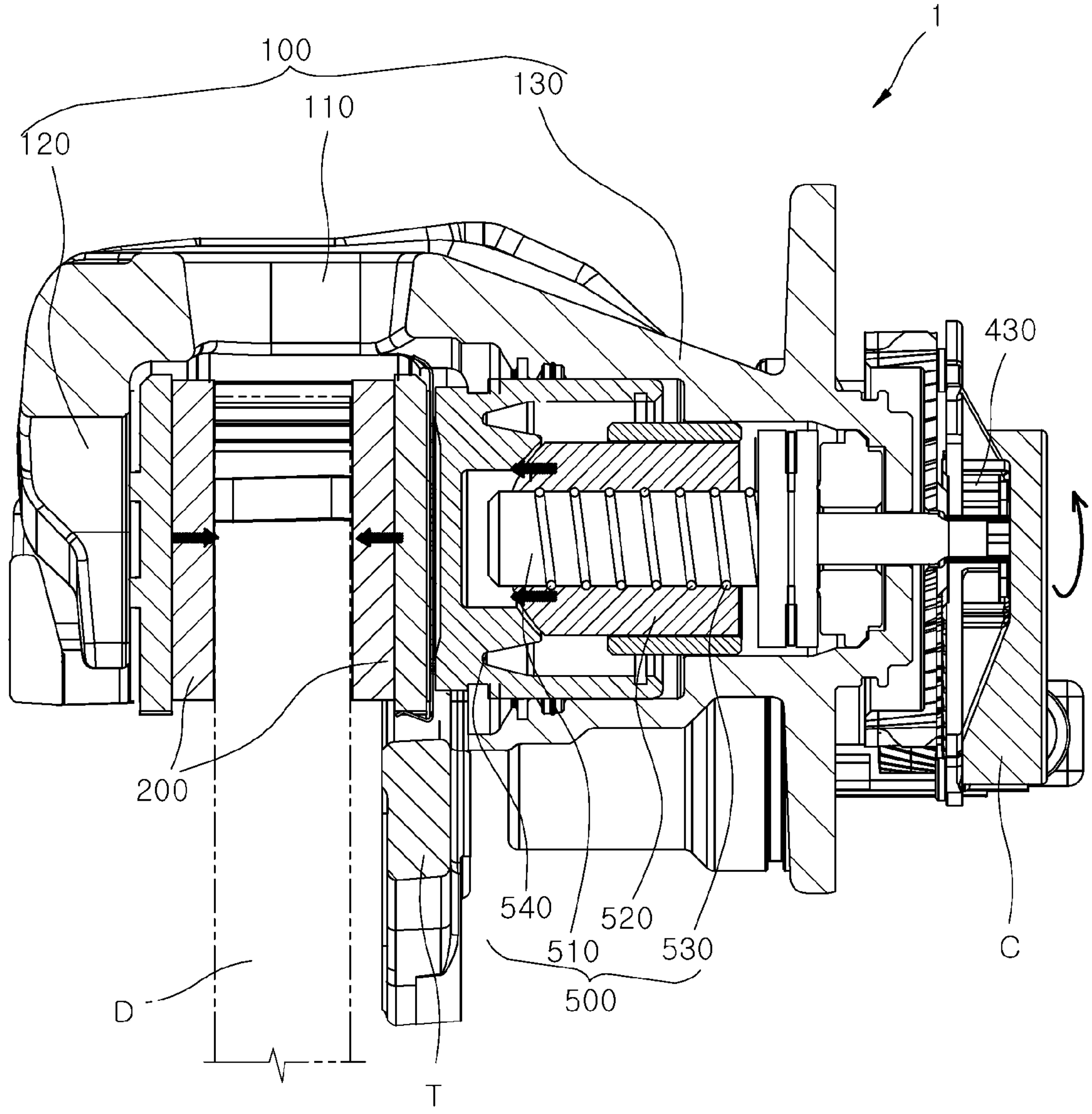
FIGS. 12 and 13 are views schematically illustrating a process in which the brake apparatus for vehicle according to the first embodiment of the present disclosure generates a brake force for parking.
Figure 13:
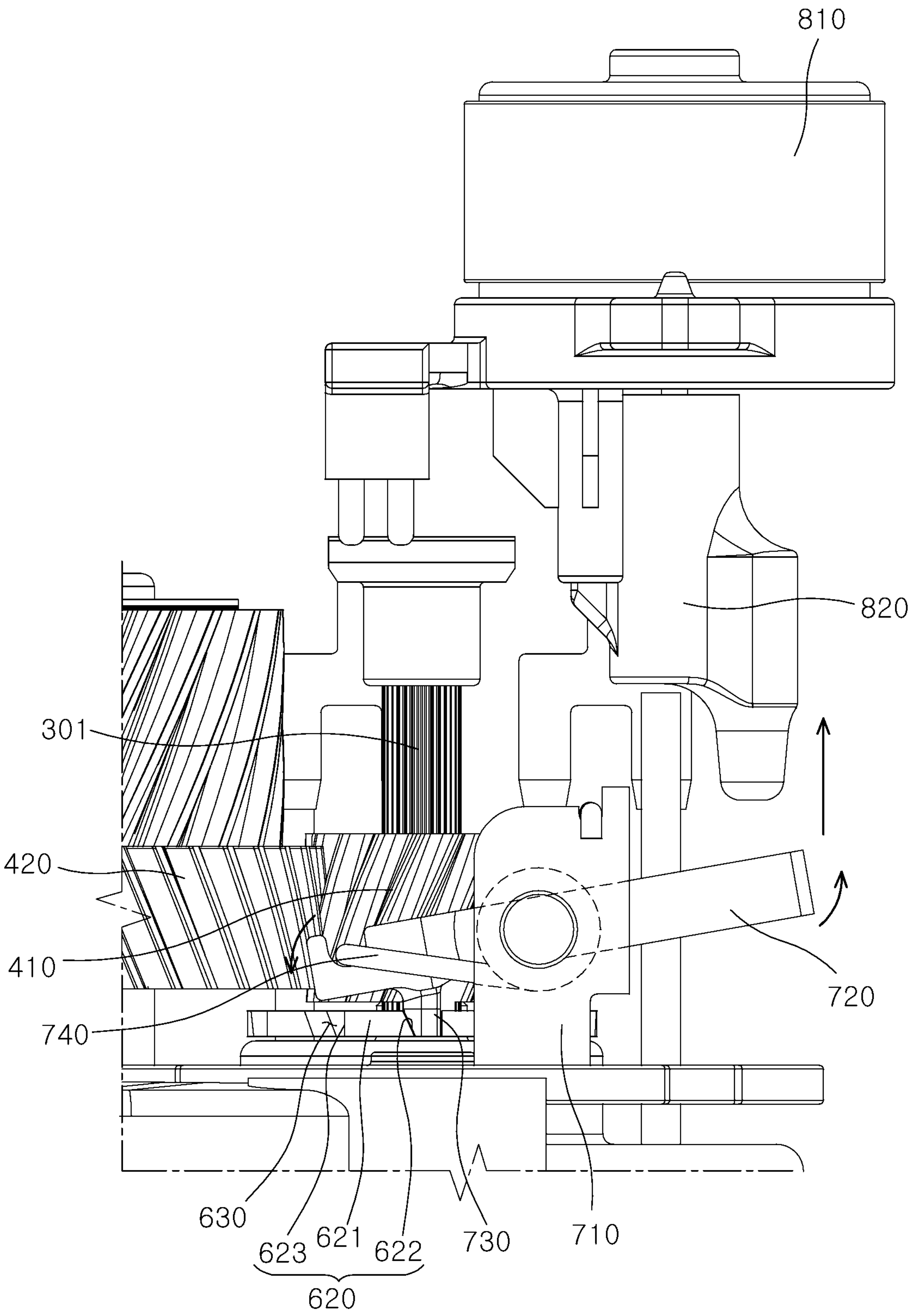

FIGS. 12 and 13 are views schematically illustrating a process in which the brake apparatus for vehicle according to the first embodiment of the present disclosure generates the brake force for parking.

With reference to FIGS. 1 to 13, in a case where the brake force for parking is generated, the adjustment member 820 is moved toward the parking lever 720 by the adjustment drive member 810 and is brought into contact with the other side of the parking lever 720, thereby rotating the parking lever 720 clockwise (with respect to FIG. 13).

As the parking lever 720 is rotated clockwise, the parking latch 731 is separated from the parking groove 630. Accordingly, the output shaft 301, the first transfer gear 410, and the first parking unit 600 may be freely rotated.

Subsequently, the output shaft 301 is rotated about the central axis thereof in the forward direction, that is, counterclockwise (with respect to FIG. 13), by the rotational force generated by the drive unit 300.

The rotational force of the output shaft 301 is transferred to the first transfer gear 410, the second transfer gear 420, and the third transfer gear 430 in this order and then to the ball screw 510.

As the ball screw 510 is rotated about the central axis thereof in the forward direction, the ball nut 520 is moved forward due to the circulation movement of the rolling body 530.

The piston member 540 is moved forward together with the ball nut 520 and is brought into contact with the brake pad 200. Then, the piston member 540 presses the brake pad 200 against the brake disc D and thus generates the brake force for parking.

Subsequently, in a case where a sufficiently high brake force for parking is applied, the adjustment member 820 is moved remotely from the parking lever 720 by the adjustment drive member 810 and is separated from the other side of the parking lever 720.

The parking lever 720 is rotated counterclockwise (with respect to FIG. 13) by an elastic force of the elastic member 740, and the parking latch 731 is inserted into the parking groove 630.

As the parking latch 731 is inserted into the parking groove 630, the parking latch 731 is brought into contact with the first contact surface 622 or the second contact surface 623 of the first parking member 620 and restricts the parking plate 610 from being rotated.

Accordingly, although the drive unit 300 stops operating, the first parking unit 600 and the second parking unit 700 may keep the generated brake force for parking exerted.

Figure 14:
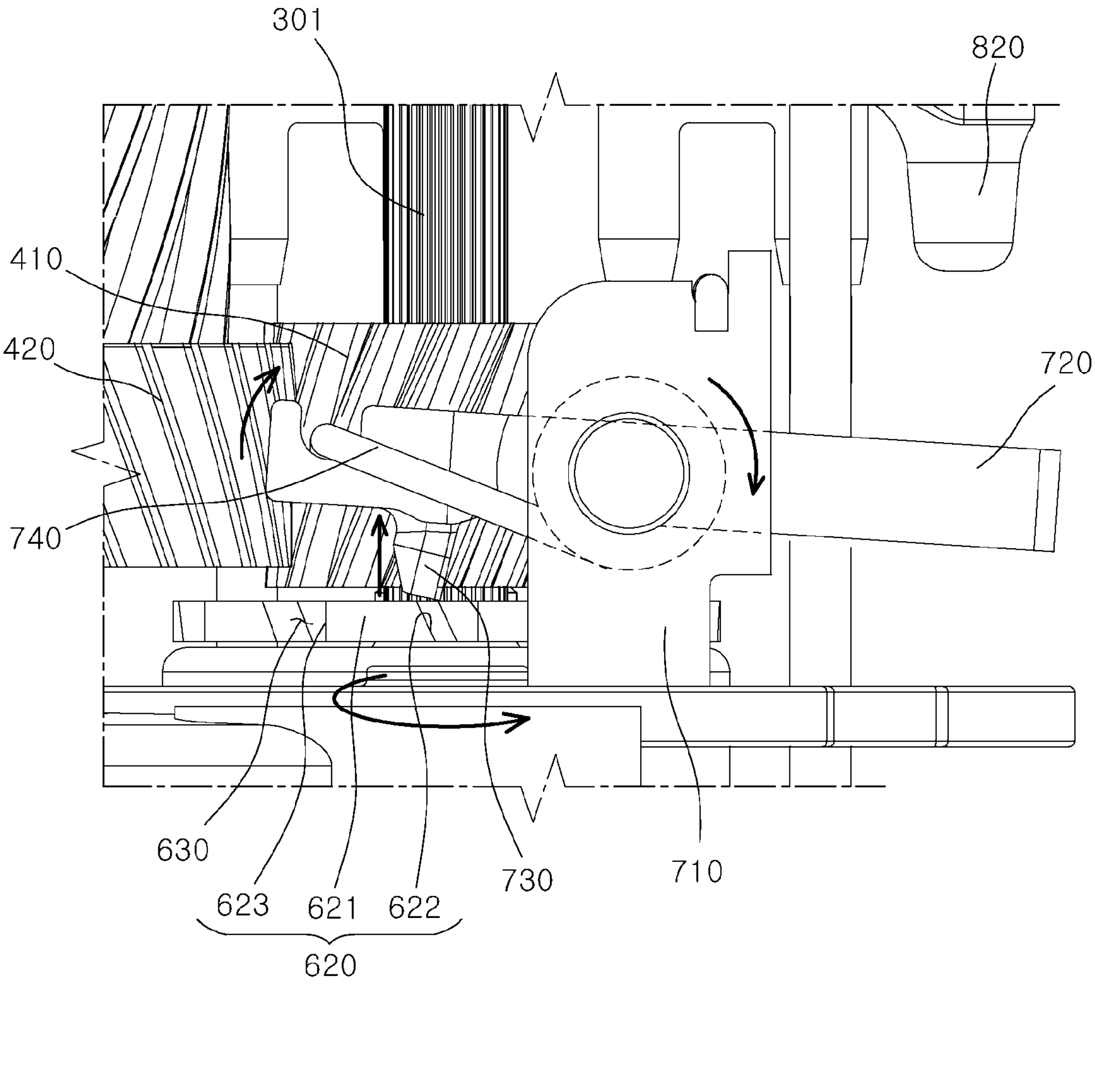
FIGS. 14 and 15 are views schematically illustrating a process in which the brake apparatus for vehicle according to the first embodiment of the present disclosure increases the brake force for parking.
Figure 15:
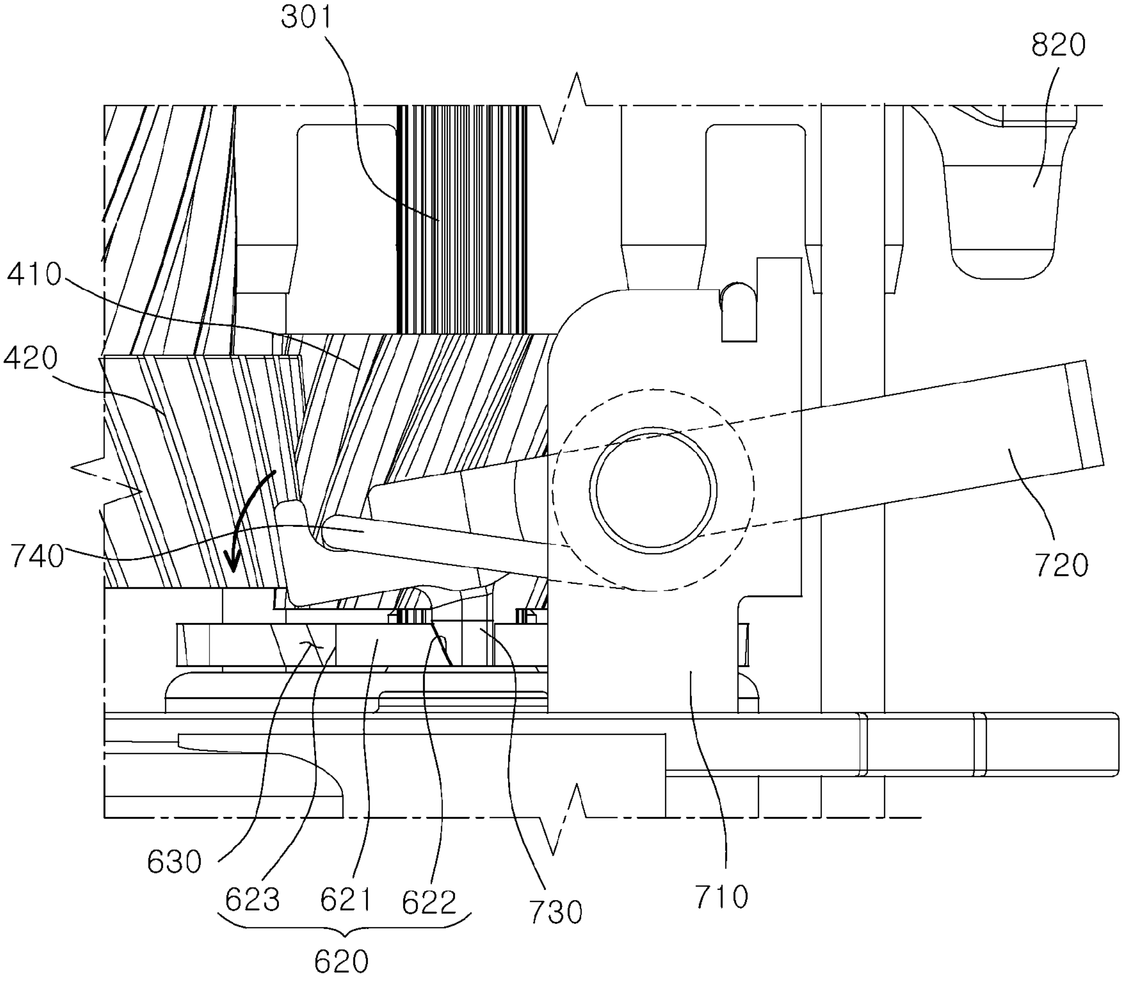

FIGS. 14 and 15 are views schematically illustrating a process in which the brake apparatus for vehicle according to the first embodiment of the present disclosure increases the brake force for parking.

With reference to FIGS. 1 to 15, in a case where the brake force for parking needs to be additionally increased, the drive unit 300 forces the output shaft 301 and the parking plate 610 to be rotated in the forward direction.

As the parking plate 610 is rotated in the forward direction, the parking latch 731 is brought into contact with the first contact surface 622. When the first contact surface 622 is arranged in a manner that is inclined with respect to the axial direction of the parking plate 610, a reaction force occurring between the parking latch 731 and the first contact surface 622 is transferred in a direction in which the parking latch 731 is separated from the parking groove 630.

When a rotational force applied to the parking plate 610 exceeds a preset magnitude, the parking latch 731 is moved to over (with respect to FIG. 14) the first contact surface 622 due to the reaction force occurring between the parking latch 731 and the first contact surface 622, and thus rotates the parking lever 720 clockwise (with respect to FIG. 14).

As the parking lever 720 is rotated clockwise, the parking latch 731 is separated from the parking groove 630.

It is possible that the parking plate 610 here is design-changed in such a manner that a preset magnitude of the rotational force applied to the parking plate 610 has a value that varies according to an inclination angle of the first contact surface 622, a modulus of elasticity of the elastic member 740 or the like.

Subsequently, the parking plate 610 is rotated in the forward direction, and the piston member 540 presses the brake pad 200 more forcefully and thus increases the brake force for parking.

As the parking plate 610 is rotated in the forward direction, the parking latch 731 separated from any one of the parking grooves 630 is arranged in such a manner as to face the neighboring parking groove 630.

Subsequently, the parking lever 720 is rotated back counterclockwise due to the elastic force applied by the elastic member 740, and the parking latch 731 is inserted into the neighboring parking groove 630.

The above-described process may be repeatedly performed until a point in time when the brake force for parking is increased sufficiently.

Figure 16:
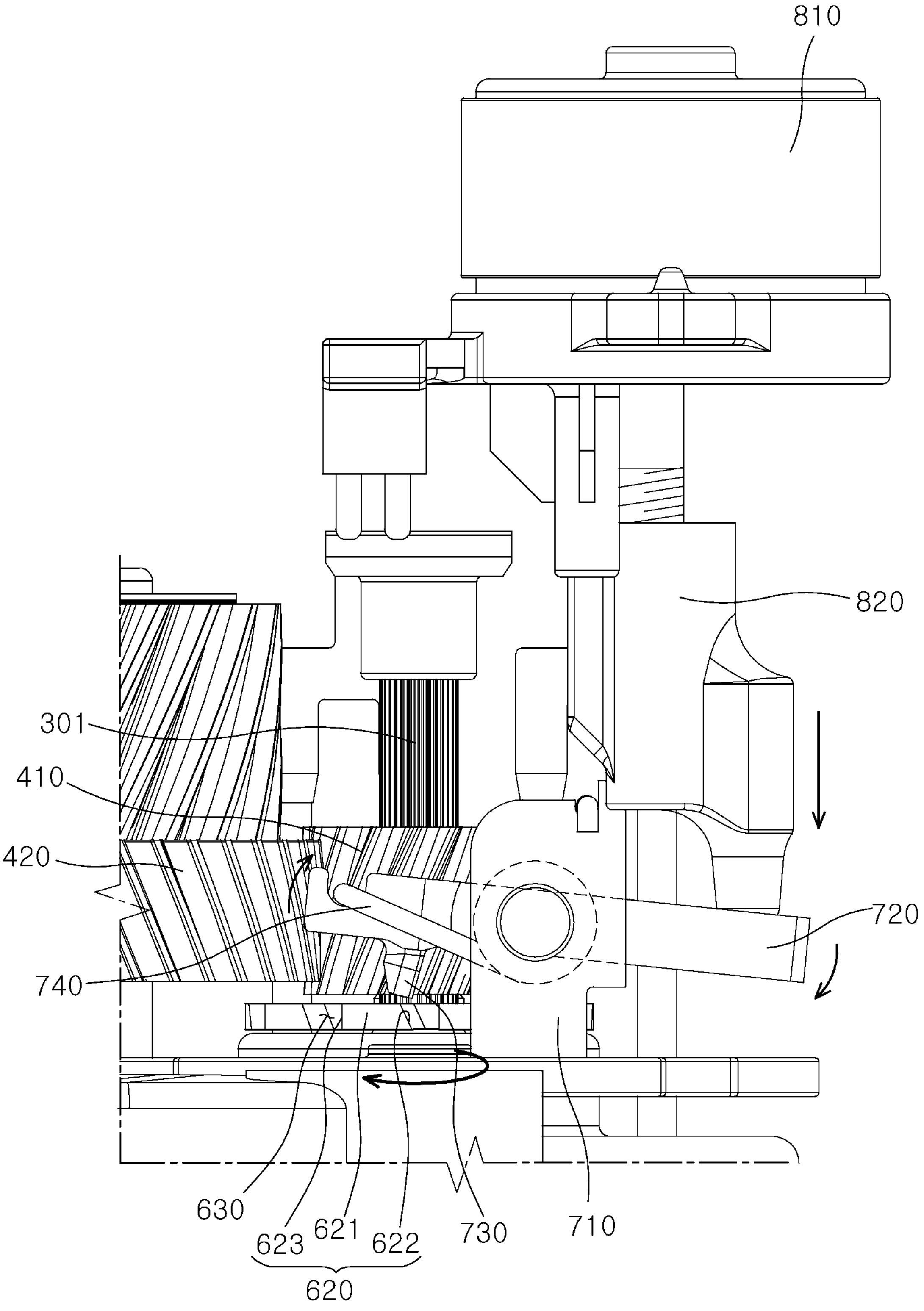
FIG. 16 is a view schematically illustrating a process in which the brake apparatus for vehicle according to the first embodiment of the present disclosure removes the brake force for parking.

FIG. 16 is a view schematically illustrating a process in which the brake apparatus for vehicle according to the first embodiment of the present disclosure removes the brake force for parking.

With reference to FIGS. 1 to 16, in a case where the brake apparatus for vehicle no longer applies the brake force for parking, the adjustment member 820 is moved toward the parking lever 720 by the adjustment drive member 810 and is brought into contact with the other side of the parking lever 720, thereby rotating the parking lever 720 clockwise (with reference to FIG. 13).

As the parking lever 720 is rotated clockwise, the parking latch 731 is separated from the parking groove 630. Accordingly, the output shaft 301, the first transfer gear 410, and the first parking unit 600 may be freely rotated.

Subsequently, the output shaft 301 is rotated in the reverse direction, that is, clockwise (with respect to FIG. 16), about the central axis thereof by the rotational force generated by the drive unit 300.

The rotational force of the output shaft 301 is transferred to the first transfer gear 410, the second transfer gear 420, and the third transfer gear 430 in this order and then to the ball screw 510.

As the ball screw 510 is rotated in the reverse direction about the central axis thereof, the ball nut 520 is moved backward by the circulation movement of the rolling body 530.

The piston member 540 is moved backward together with the ball nut 520, and is separated from the brake pad 200. Thus, the brake force for parking is no longer applied.

A configuration of a brake apparatus for vehicle according to a second embodiment of the present disclosure is described below.

The brake apparatus for vehicle according to the second embodiment of the present disclosure may include the caliper body 100, the brake pad 200, the drive unit 300, the transfer gear 400, the piston unit 500, the first parking unit 600, the second parking unit 700, and the adjustment unit 800.

The brake apparatus for vehicle according to the second embodiment of the present disclosure may be configured to have only a different structure of the second contact surface 623 than the brake apparatus for vehicle according to the first embodiment of the present disclosure. Accordingly, only the second contact surface 623 of the brake apparatus for vehicle according to the second embodiment of the present disclosure that is different from that of the brake apparatus for vehicle according to the first embodiment of the present disclosure is described. The descriptions and the drawings of the other constituent elements of the brake apparatus for vehicle according to the first embodiment of the present disclosure may apply to the brake apparatus for vehicle according to the second embodiment of the present disclosure without any change.

Figure 17:
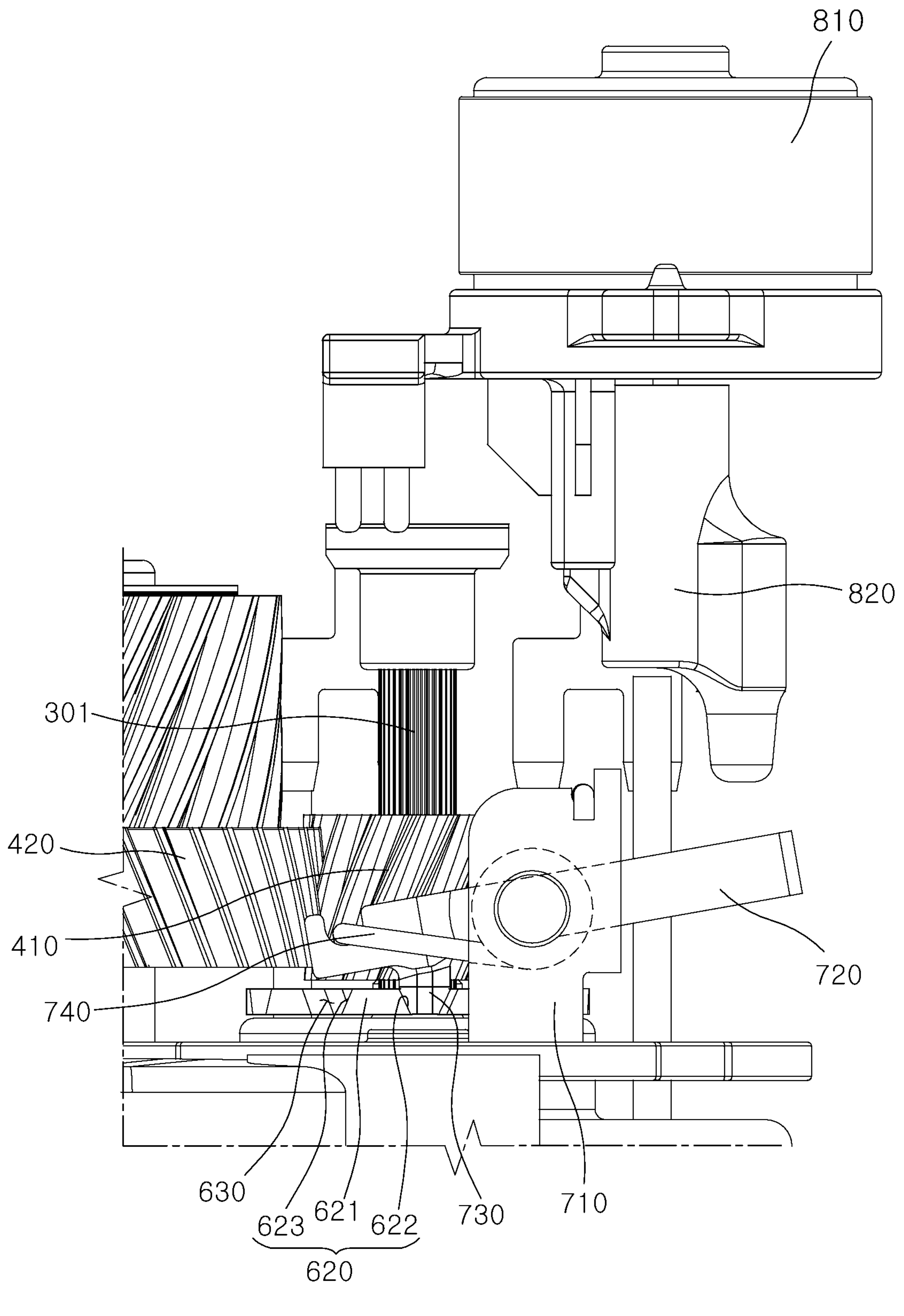
FIG. 17 is a front view schematically illustrating a state where a first parking unit, a second parking unit, and an adjustment unit according to a second embodiment of the present disclosure are installed.
Figure 18:
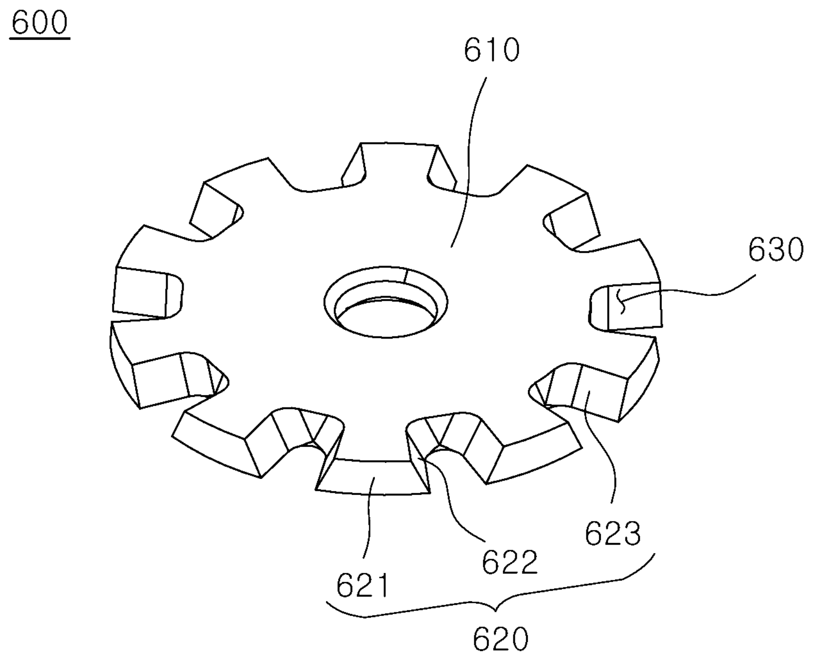
FIG. 18 is a perspective view schematically illustrating a configuration of the first parking unit according to the second embodiment of the present disclosure.

FIG. 17 is a front view schematically illustrating a state where the first parking unit 600, the second parking unit 700, and the adjustment unit 800 according to the second embodiment of the present disclosure are installed. FIG. 18 is a perspective view schematically illustrating a configuration of the first parking unit 700 according to the second embodiment of the present disclosure.

With reference to FIGS. 17 and 18, the second contact surface 623 according to the present embodiment may be arranged in a manner that is inclined with respect to the axial direction of the parking plate 610. For example, as illustrated in FIGS. 17 and 18, the second contact surface 623 may be arranged in such a manner that the more closely an upper end (with respect to FIG. 17) of the first parking body 621 is approached, the closer an upper end portion of the second contact surface 623 is to the first contact surface 622. In a case where the rotational force applied in the reverse direction to the parking plate 610 exceeds a preset magnitude, due to the inclination angle, the second contact surface 623 may guide the separation of the parking latch 731 from the parking groove 630. Accordingly, after the brake force for parking is applied, in a case where movement of the adjustment member 820 is impossible due to a failure of the adjustment drive member 810 or the like, the first contact surface 622 may guide forced rotation of the parking plate 610 in the reverse direction.

Operation of the brake apparatus for vehicle according to the second embodiment of the present disclosure is described below.

The brake apparatus for vehicle according to the second embodiment of the present disclosure may perform the same operation as the brake apparatus for vehicle according to the first embodiment of the present disclosure that is illustrated in FIGS. 12 to 16. Accordingly, only steps of the operation of the brake apparatus for vehicle according to the second embodiment of the present disclosure that are not described with reference to FIGS. 12 to 16 are described.

Figure 19:
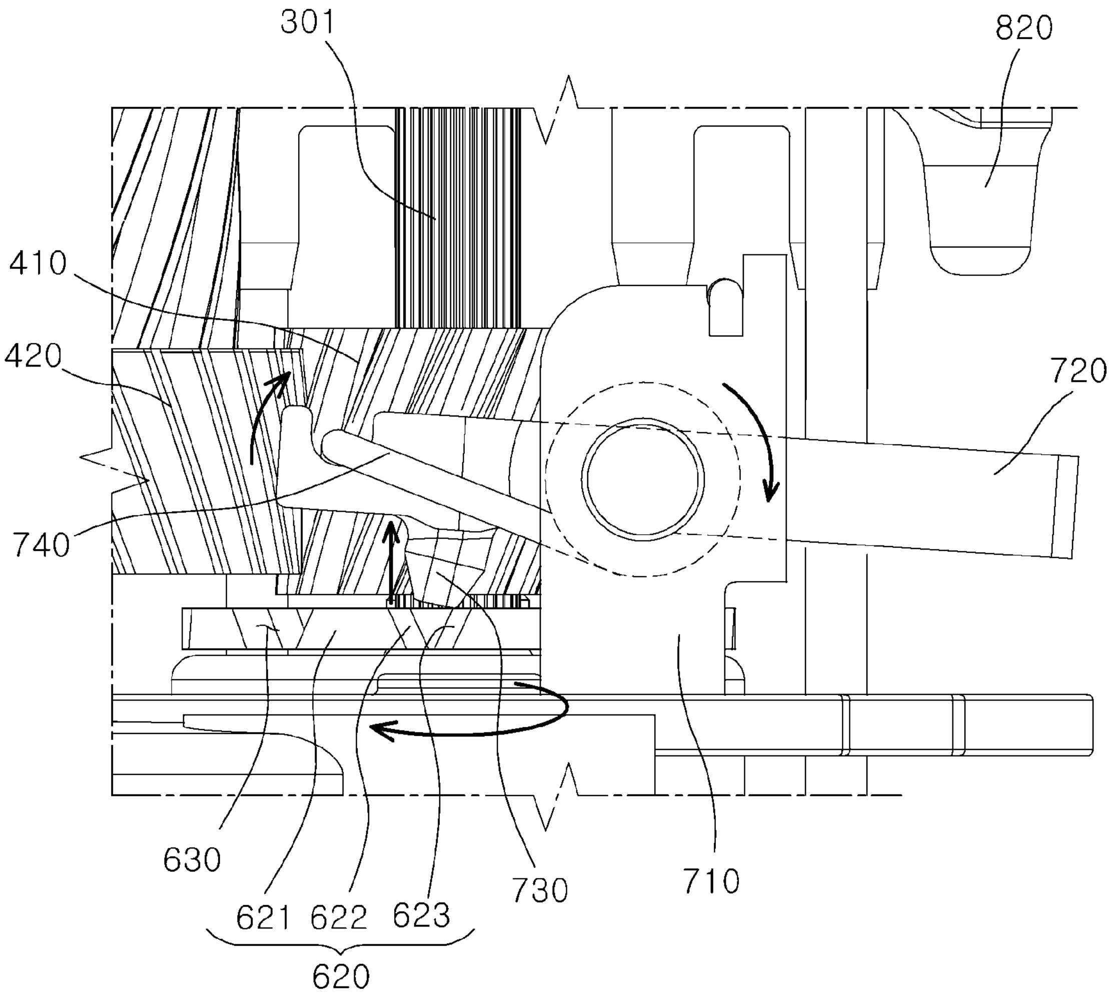
FIGS. 19 and 20 are views schematically illustrating a process in which the brake apparatus for vehicle according to the second embodiment of the present disclosure forcibly removes the brake force for parking.
Figure 20:
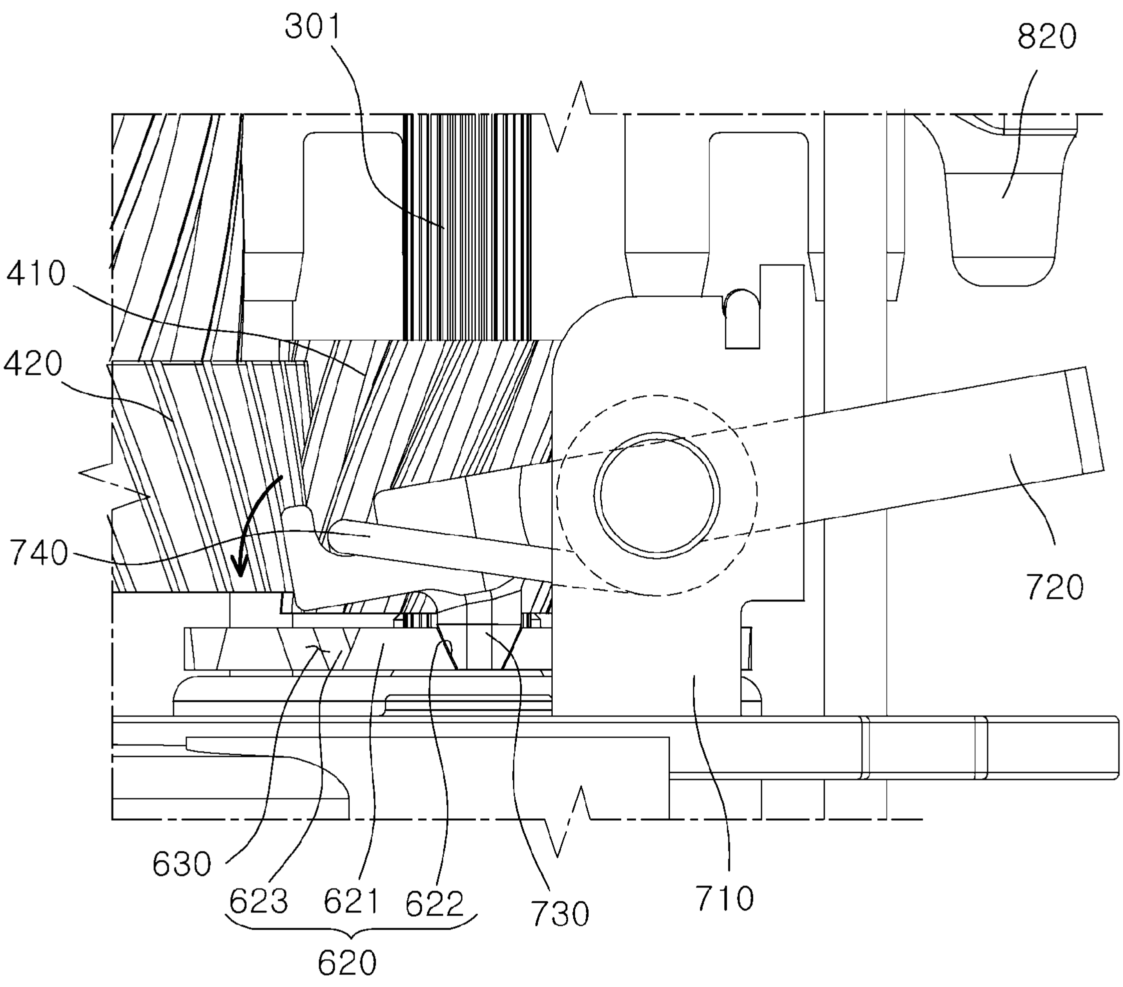

FIGS. 19 and 20 are views schematically illustrating a process in which the brake apparatus for vehicle according to the second embodiment of the present disclosure forcibly removes the brake force for parking.

In a case where, due to the failure of the adjustment drive member 810 or the like, there is a need to forcibly stop applying the brake force for parking, the drive unit 300 forcibly rotates the output shaft 301 and the parking plate 610 in the reverse direction.

As the parking plate 610 is rotated in the reverse direction, the parking latch 731 is brought into contact with the second contact surface 623. When the second contact surface 623 is arranged in a manner that is inclined with respect to the axial direction of the parking plate 610, a reaction force occurring between the parking latch 731 and the second contact surface 623 is transferred in a direction in which the parking latch 731 is separated from the parking groove 630.

When the rotational force applied to the parking plate 610 exceeds the preset magnitude, the parking latch 731 is moved to over (with respect to FIG. 19) the second contact surface 623 due to the reaction force occurring between the parking latch 731 and the second contact surface 623, and thus rotates the parking lever 720 clockwise (with respect to FIG. 19).

As the parking lever 720 is rotated clockwise, the parking latch 731 is separated from the parking groove 630.

It is possible that the parking plate 610 here is design-changed in such a manner that the preset magnitude of the rotational force applied to the parking plate 610 has a value that varies according to an inclination angle of the second contact surface 623, the modulus of elasticity of the elastic member 740 or the like.

Subsequently, the parking plate 610 is rotated in the reverse direction, and the piston member 540 is separated from the brake pad 200. Thus, the brake force for parking is no longer applied.

As the parking plate 610 is rotated in the reverse direction, the parking latch 731 separated from any one of the parking grooves 630 is arranged in such a manner as to face the neighboring parking groove 630.

Subsequently, the parking lever 720 is rotated back counterclockwise due to the elastic force applied by the elastic member 740, and the parking latch 731 is inserted into the neighboring parking groove 630.

The above-mentioned process may be repeatedly performed until a point in time when the brake force for parking is sufficiently no longer applied.

The embodiments of the present disclosure are described only in an exemplary manner with reference to the drawings. It would be understandable by a person of ordinary skill in the art to which the present disclosure pertains that various modifications may possibly be made to the embodiments and that various equivalents thereof may possibly be implemented.

Thus, the technical scope of the present disclosure should be defined by the following claims.

What is claimed is:

1. A brake apparatus for a vehicle, the brake apparatus comprising:

a caliper body;

a drive unit connected to the caliper body and configured for generating a rotational force;

a transfer gear engaged to the drive unit and transferring the rotational force generated by the drive unit to a piston unit engaged to the transfer gear;

a first parking unit rotated together with the transfer gear;

a second parking unit movably mounted on the caliper body and, according to a direction of a movement of the second parking unit, selectively interfering with a rotation of the first parking unit; and an adjustment unit mounted to be spaced away from the second parking unit, wherein the first parking unit comprises:

a parking plate supplied with the rotational force from the drive unit and rotated in a forward direction or a reverse direction;

a plurality of first parking members extending from the parking plate; and a plurality of parking grooves arranged between neighboring first parking members, wherein the second parking unit is inserted into the parking grooves or separated from the parking grooves according to the direction of the movement of the second parking unit, wherein each of the first parking members comprises:

a first parking body;

a first contact surface arranged on a first side of the first parking body and, as the parking plate is rotated in the forward direction, brought into contact with the second parking unit inserted into the parking grooves; and a second contact surface arranged on a second side of the first parking body and, as the parking plate is rotated in the reverse direction, brought into contact with the second parking unit inserted into the parking grooves, wherein the first contact surface is formed to be inclined with respect to an axial direction of the parking plate, wherein the second contact surface is formed to be inclined with respect to the axial direction of the parking plate, and wherein, when the rotational force applied to the parking plate exceeds a preset magnitude, the second contact surface separates the second parking unit from the parking grooves.

2. The brake apparatus of claim 1, wherein the transfer gear comprises:

a first transfer gear connected to an output shaft of the drive unit; and a second transfer gear gear-engaged to the first transfer gear, wherein the parking plate is connected to the output shaft and is rotated at a same angular speed as the first transfer gear.

3. The brake apparatus of claim 1, wherein the plurality of first parking members are arranged to be spaced away from each other along a circumferential direction of the parking plate.

4. The brake apparatus of claim 3, wherein the plurality of first parking members are equally spaced from each other.

5. The brake apparatus of claim 1, wherein, when the rotational force applied to the parking plate exceeds a preset magnitude, the first contact surface separates the second parking unit from the parking grooves.

6. The brake apparatus of claim 1, wherein the second parking unit comprises:

a support bracket fixed to the caliper body;

a parking lever rotatably connected to the support bracket; and a second parking member extending from a first side of the parking lever and, according to a direction of a rotation of the parking lever, inserted into the parking grooves or separated from the parking grooves.

7. The brake apparatus of claim 6, wherein the second parking member comprises:

a plurality of parking latches inserted into different parking grooves, respectively.

8. The brake apparatus of claim 7, wherein each of the parking latches is formed in so that a width of the parking latches is decreased toward an end thereof.

9. The brake apparatus of claim 6, wherein the second parking unit further comprises:

an elastic member provided between the support bracket and the parking lever and rotating the parking lever in a direction in which the second parking member is inserted into the parking grooves.

10. The brake apparatus of claim 6, wherein the adjustment unit comprises:

an adjustment drive member configured for generating a drive force; and an adjustment member reciprocating by the drive force generated by the adjustment drive member and, according to a direction of a movement of the adjustment member, brought into contact with or separated from a second side of the parking lever.

11. The brake apparatus of claim 10, wherein, as the adjustment member is brought into contact with the second side of the parking lever, the adjustment member rotates the parking lever in a direction in which the second parking member is separated from the parking grooves.

* * * * *